US009323442B2

(12) United States Patent
Ledet et al.

(10) Patent No.: US 9,323,442 B2
(45) Date of Patent: Apr. 26, 2016

(54) MANAGING ITEMS IN A USER INTERFACE

(75) Inventors: Raleigh Joseph Ledet, Sunnyvale, CA (US); Jeffrey Traer Bernstein, San Francisco, CA (US); B. Michael Victor, Menlo Park, CA (US); Avi E. Cieplinksi, San Francisco, CA (US); Kristin Forster, Los Altos Hills, CA (US); Craig Federighi, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 834 days.

(21) Appl. No.: 12/895,770

(22) Filed: Sep. 30, 2010

(65) Prior Publication Data

US 2012/0084689 A1    Apr. 5, 2012

(51) Int. Cl.
*G06F 3/048* (2013.01)
*G06F 3/0486* (2013.01)

(52) U.S. Cl.
CPC .................. *G06F 3/0486* (2013.01)

(58) Field of Classification Search
CPC .............................. G06F 3/0486; G06F 3/048
USPC ........................................................ 715/769
See application file for complete search history.

(56) References Cited

U.S. PATENT DOCUMENTS

| 5,483,261 A | 1/1996 | Yasutake |
| 5,488,204 A | 1/1996 | Mead et al. |
| 5,742,286 A | 4/1998 | Kung et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |

(Continued)

FOREIGN PATENT DOCUMENTS

| JP | 2000-163031 A | 6/2000 |
| JP | 2002-342033 A | 11/2002 |

(Continued)

OTHER PUBLICATIONS

Nayuko Watanabe et al., "Bubble Clusters: An Interface for Manipulating Spatial Aggregation of Graphical Objects", UIST'07 Proceedings of the 20th Annual ACM Symposium on User Interface Software and Technology, Oct. 7-10, 2007, Newport, Rhode Island, pp. 173-182, XP-002664449.

(Continued)

*Primary Examiner* — Angie Badawi
(74) *Attorney, Agent, or Firm* — Morrison & Foerster LLP

(57) ABSTRACT

User interface changes related to moving items in a user interface are disclosed. An operation (e.g., a drag operation) can be initiated on selected items by moving a cursor or pointing device in the user interface, and an animation can be presented illustrating representations of the selected items moving from their respective original locations toward a current location of the cursor or pointing device and forming a cluster in proximity to the current location of the cursor or pointing device. As the cluster of items is moved over a container object in the user interface, the representations of the items can adopt the appearance style defined by that container object. The representations of the items can also be shown to depart from the cluster and move toward anticipated locations of the items in the container object as a preview of a drop operation into the container object.

68 Claims, 25 Drawing Sheets

(56) References Cited

U.S. PATENT DOCUMENTS

| | | | |
|---|---|---|---|
| 6,690,387 | B2 | 2/2004 | Zimmerman et al. |
| 7,015,894 | B2 | 3/2006 | Morohoshi |
| 7,072,450 | B1 * | 7/2006 | Pinard ..................... 379/88.11 |
| 7,184,064 | B2 | 2/2007 | Zimmerman et al. |
| 7,337,409 | B2 | 2/2008 | Doblmayr et al. |
| 7,370,281 | B2 | 5/2008 | Weber |
| 7,650,575 | B2 | 1/2010 | Cummins et al. |
| 7,663,607 | B2 | 2/2010 | Hotelling et al. |
| 7,752,566 | B1 * | 7/2010 | Nelson .......................... 715/769 |
| 8,479,122 | B2 | 7/2013 | Hotelling et al. |
| 2005/0283742 | A1 * | 12/2005 | Gusmorino et al. ........ 715/839 |
| 2006/0026521 | A1 | 2/2006 | Hotelling et al. |
| 2006/0112354 | A1 * | 5/2006 | Park et al. ................... 715/835 |
| 2006/0129586 | A1 | 6/2006 | Arrouye et al. |
| 2006/0161868 | A1 * | 7/2006 | Van Dok et al. ............ 715/835 |
| 2006/0197753 | A1 | 9/2006 | Hotelling |
| 2006/0256084 | A1 * | 11/2006 | Hey et al. .................... 345/157 |
| 2007/0192749 | A1 * | 8/2007 | Baudisch ..................... 715/863 |
| 2008/0298766 | A1 * | 12/2008 | Wen et al. ...................... 386/46 |
| 2009/0164439 | A1 * | 6/2009 | Nevins ............................ 707/3 |
| 2009/0228820 | A1 * | 9/2009 | Kim et al. .................... 715/769 |
| 2010/0122195 | A1 * | 5/2010 | Hwang ................ G06F 3/0488 715/769 |
| 2010/0275122 | A1 * | 10/2010 | Buxton et al. ............... 715/728 |
| 2011/0161852 | A1 * | 6/2011 | Vainio et al. ................. 715/769 |
| 2011/0296336 | A1 * | 12/2011 | Law et al. .................... 715/777 |
| 2012/0066144 | A1 * | 3/2012 | Berkvens et al. ............ 705/345 |

FOREIGN PATENT DOCUMENTS

| | | |
|---|---|---|
| JP | 2003233446 A | 8/2003 |
| WO | WO2007142256 A1 | 12/2007 |
| WO | WO-2012/044779 A1 | 4/2012 |

OTHER PUBLICATIONS

PCT International Search Report and Written Opinion for Application No. PCT/US2011/053901 dated Dec. 9, 2011, 8 pages.

Dutch Search Report and Written Opinion for Application No. 2007490 dated Dec. 14, 2011, 8 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

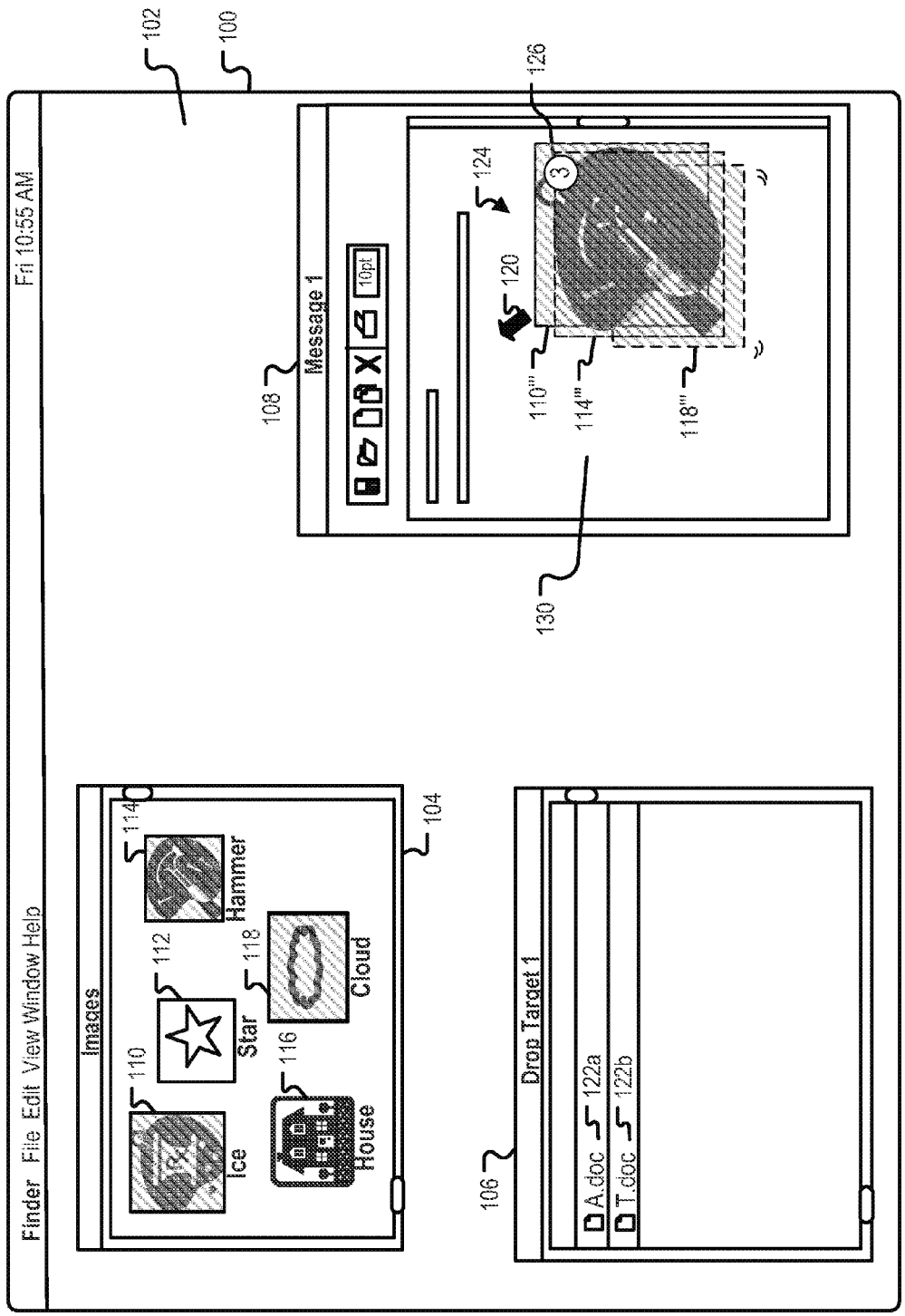

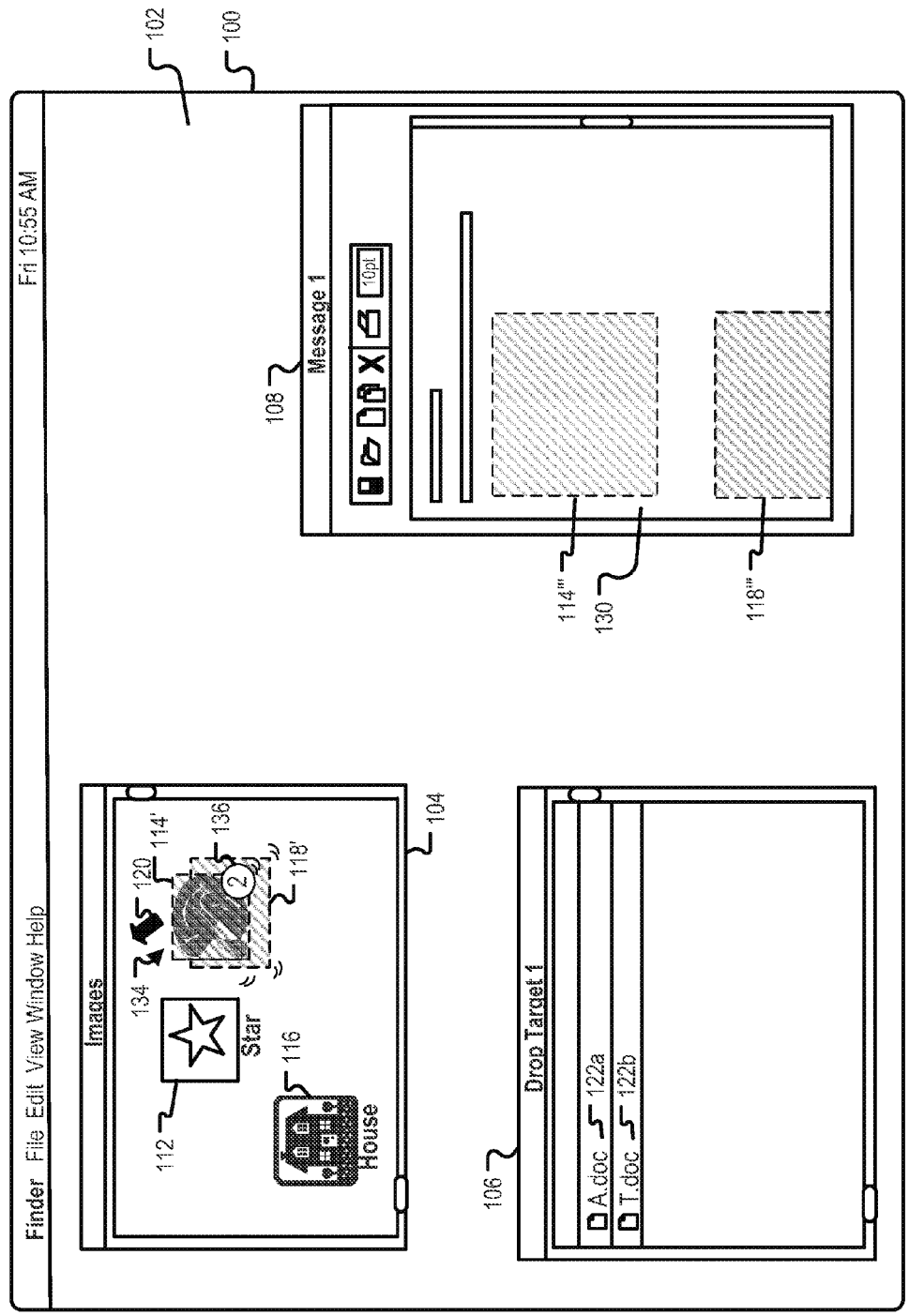

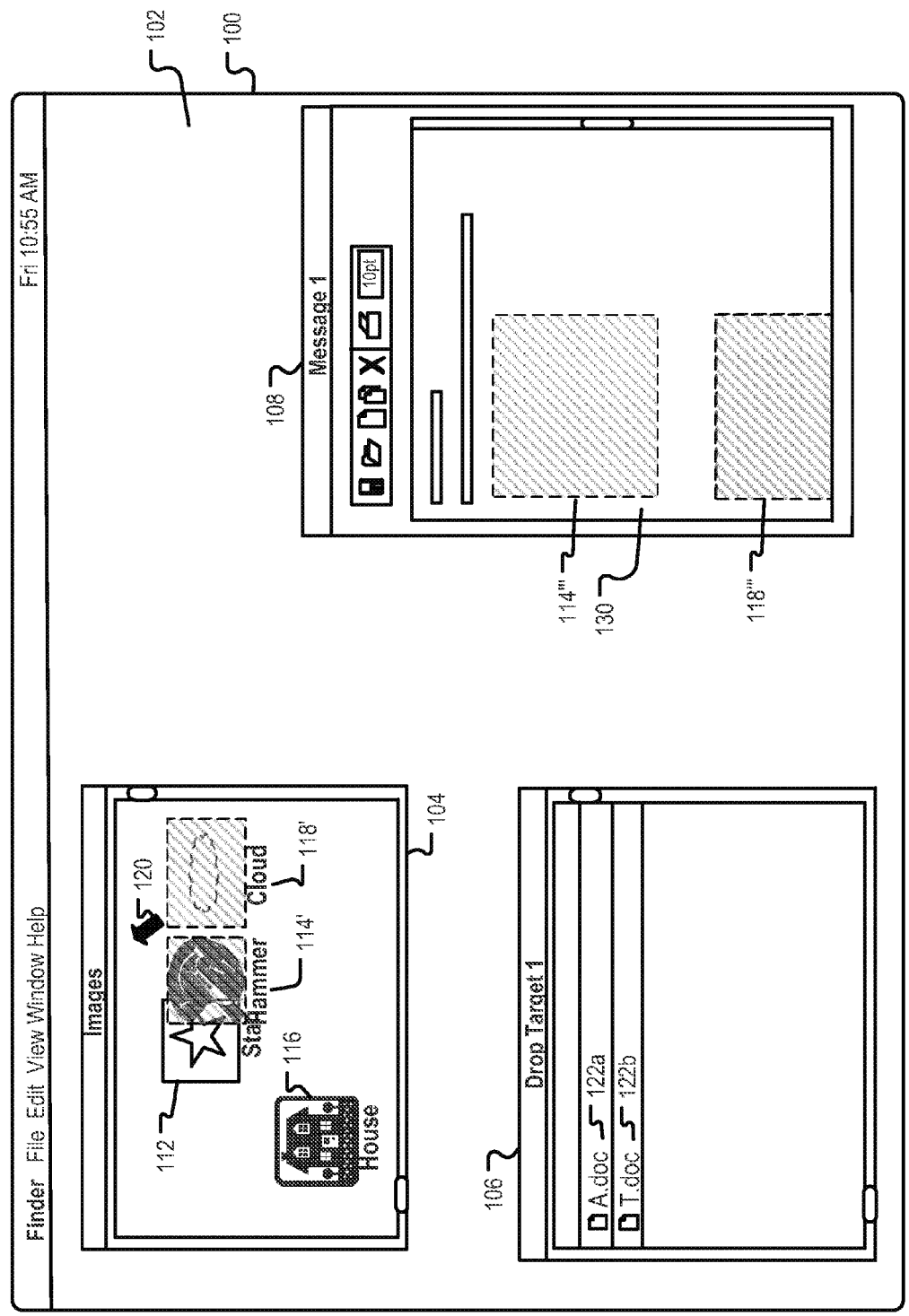

300

```
Detecting the current location of the pointer within a drop zone of a second
container in the user interface
                                                                    302
```
↓
```
While the current location of the pointer remains within the drop zone of the
second container, causing the representations of the selected items to adopt
respective second appearances
                                                                    304
```

```
Detecting an input requesting a preview of the items' representations being
dropped in the second container
                                                                    402
```
↓
```
In response to detecting the input, animating the representations of the
selected items to depart from the cluster and move toward their respective
anticipated locations in the second container
                                                                    404
```

```
Detecting an input releasing the one or more selected items into the drop
zone of the second container
                                                                    412
```
↓
```
In response to the releasing input, causing the one or more selected items to
be inserted at the respective anticipated locations of the selected items in the
second container
                                                                    414
```

FIG. 4B

MANAGING ITEMS IN A USER INTERFACE

TECHNICAL FIELD

This disclosure relates generally to managing information items on a computing device.

BACKGROUND

Modern computing devices often include file systems that store information items in various directories or subdirectories (e.g., folders) in a file system hierarchy. In a graphical user interface (GUI), representations of the information items (e.g., icons) can be shown in respective container objects (e.g., the desktop, folder windows) associated with a parent item of the information items to indicate the locations of the information item in the file system hierarchy.

Each container object can be associated with an appearance style (e.g., a large icon view, a small icon view, a list view, a column view, etc.). Representations of the information items contained in the container object can take on respective appearances according to the appearance style associated with the container object. When an item is moved from one container to another container having a different appearance style, or when the appearance style of a current container is modified, the appearance of the item's representation can be changed according to the current appearance style of the item's current container.

Many operating systems enable a drag and drop operation to be performed on items that are currently selected in a GUI. In the drag and drop operation, representations of the selected items can be moved (or "dragged") in the user interface from one container object to another container object following the movement of a pointer (e.g., a mouse cursor or pointing device on a touch-sensitive surface). When the items are released (or "dropped") over the drop zone of a desired target container, the selected items become the content items of the target container and the representations of the items appear in the target container according to the appearance style associated with the target container.

SUMMARY

A user or application can select one or more item representations in a user interface and initiate an operation (e.g., a drag operation) on the selected item representations by a movement of a cursor (e.g., a mouse cursor or trackball cursor) or pointing device (e.g., a finger or stylus) in the user interface. When the operation is initiated, an animation can be presented illustrating the item representations moving toward a current location of the cursor or pointing device in the user interface and forming a cluster in proximity to the current location of the cursor or pointing device. As the cursor or pointing device moves in the user interface, the cluster of item representations can move with the cursor or pointing device in the user interface. Each item representation in the cluster can move in the user interface along a different path and at a different speed or acceleration than other item representations in the cluster.

When the item representations are initially selected, the item representations can have respective first appearances according to the appearance style associated with the container object from which the item representations are selected. As the cluster of item representations is moved over a drop zone of a container object in the user interface, the item representations in the cluster can take on respective appearances based on the appearance style associated with that container object.

In some implementations, a change in appearance is not presented if a user is moving the cluster over a container object in passing to reach another destination in the user interface, and the change in appearance is presented upon determination that the user is moving the cluster over the container object with the intent to place the cluster in the container object. The user's intent can be estimated based on motion characteristics such as the speed or acceleration of the cursor or pointing device in the user interface as the cluster is moved over the container object.

In some implementations, when the cluster of item representations is moved over an area of an ineligible drop target, the item representations in the cluster can take on respective appearances that are different from their original appearances in the source container from which the item representations are selected. The new appearances can be based on an appearance style that is defined by the source container for the ineligible drop target. In some implementations, the source container can define any number of different appearance styles that can be applied to the item representations based on different trigger events (e.g., hovering of the item representations over an ineligible drop target, passing of the item representations over particular regions within the source container, etc.).

In some implementations, when the pointer or the cluster is hovered over a potential target container for more than a defined time period, an animation can be presented to show the item representations departing from the cluster and moving toward the representations' anticipated locations in the target container object as a preview of a drop operation into the target container object. The item representations can appear in a preview state (e.g., as semi-transparent overlays) at or in proximity to the item representations' anticipated locations and adopt the appearance style associated with the potential target container object. If the anticipated locations of some item representations are in an area of the potential target container object that is not currently visible in the user interface, those item representations can be shown to move from the cluster into the invisible area along respective paths in the user interface.

In some implementations, if the cursor or pointing device is moved away from the potential target container without dropping the selected items, the representations of the selected items can be animated to dislodge from their respective locations at or near the anticipated locations and rejoin the cluster in proximity to the current location of the cursor or pointing device. Alternatively, if the selected items are released into the potential target container, the representations of the selected items can be animated to transition from a first state (e.g., a semi-transparent state) to a second state (e.g., an opaque state) and settle at the items' anticipated locations in the potential target container.

Some implementations include one or more application programming interfaces (APIs) in an environment with calling program code interacting with other program code being called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

At least certain implementations include an environment with a calling software component interacting with a called software component through an API. A method for operating through an API in this environment includes transferring one or more function calls, messages, and other types of invocations or parameters via the API.

In some implementations, the item representations can have appearances that are generated by the operating system based on various appearance styles defined by the source container object, and various potential drop target containers. Each appearance style can be defined through the API by a corresponding container. Each appearance style can specify one or more layers for the item representation, and each layer can be associated with different properties and rules that control the appearance of the layer, the animation style of the layer, and so on. Different animations can be performed on the different layers independently of one another.

In addition to the appearance style of the individual item representations, each container object can also define respective formation styles for the multiple items (e.g., all selected items) collectively as the item representations are in their various appearances. The formation styles can also be defined by their corresponding container objects through the API. Examples of the formation styles can include the layout of the item representations in their source container, the cluster formation near the pointer, and the preview formation in a potential drop target container as described herein. Other formation styles can be defined. Different animation styles that can be applied to illustrate the respective transitions between appearances and formations can also be specified by the source container or the potential drop target containers through the API.

The details of one or more implementations of managing items in a user interface are set forth in the accompanying drawings and the description below. Other features, aspects, and advantages will become apparent from the description, the drawings, and the claims.

BRIEF DESCRIPTION OF THE DRAWINGS

FIGS. 1J-1K illustrate exemplary user interface changes showing the cluster of item representations being dragged into a second potential target container associated with a second appearance style and the cluster of item representations changing their appearances according to the appearance style of the second potential target container.

FIGS. 1N-1P illustrate exemplary user interface changes showing selection and dragging of one or more items from a first container to a second container that is in a free-arranged state.

FIGS. 1Q-1R illustrate exemplary user interface changes showing a preview of the item representations being displayed at their anticipated locations in the second container and being moved by the pointer in the second container object during the preview.

FIG. 3 is a flow diagram of an exemplary process for changing the appearances of the item representations when the cluster of item representations are moved to a container associated with a different appearance style.

FIG. 4A is a flow diagram of an exemplary process for showing a preview of the item representations at their respective anticipated locations in a potential target container.

FIG. 4B is a flow diagram of an exemplary process for dropping the selected items in the potential target container.

Like reference symbols in the various drawings indicate like elements.

DETAILED DESCRIPTION

Figure 1A:
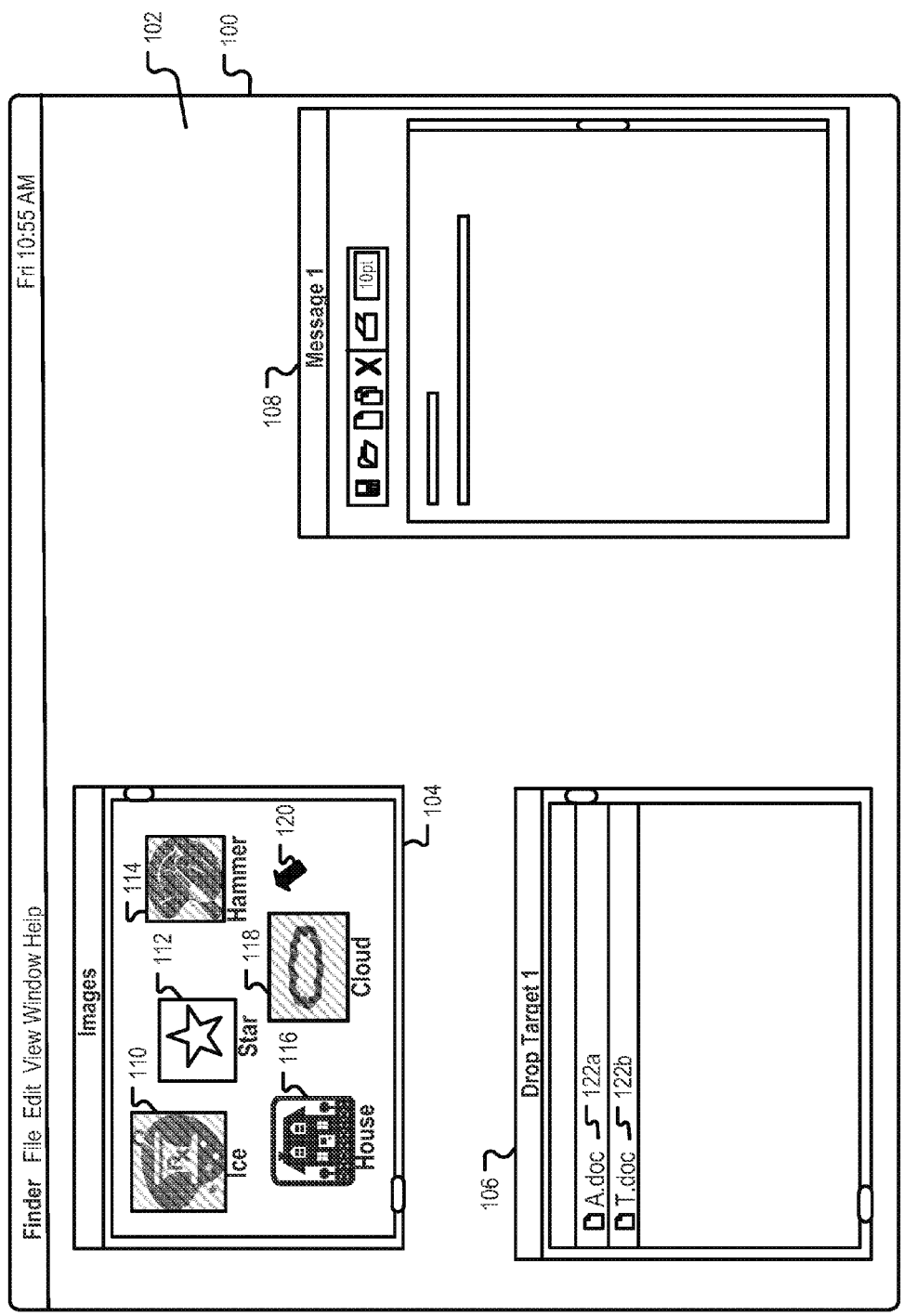
FIGS. 1A-1C illustrate exemplary user interface changes showing representations of multiple selected items moving toward a current location of a pointer and forming a cluster in proximity to the current location of the pointer in response to the initiation of a defined operation (e.g., a drag operation) on the selected items.

Exemplary User Interfaces for Dragging and Dropping Items in a User Interface In a file system, information items (e.g., files and folders) can be organized in a file system hierarchy. Each information item (e.g., files and folders) can be contained in a parent item (e.g., a parent folder) in the file system hierarchy. In an application program (e.g., an html editor, a word processor, an email editor, etc.) for editing a document, content items (e.g., image, videos, data objects, etc.) can be embedded at particular locations in the document. In addition, information items (e.g., address book entries, data objects) and user interface elements (e.g., buttons) can be moved from and inserted at defined locations in an application window.

In a graphical user interface (GUI), container objects, such as the desktop, folder windows and/or application windows, can be used to represent folders in the file system hierarchy, present new or existing application documents, and/or present user interface elements or data objects. Representations (e.g., icons) of information items (e.g., files and folders) contained in a parent folder can be displayed within the container object (e.g., a folder window or the desktop) representing the parent folder in the GUI. Similarly, representations (e.g., thumbnail images or icons) of content items (e.g., images, video clips, data objects, etc.) can be displayed within a container object (e.g., an application window) presenting an application document in which the content items are embedded. Similarly, representations (e.g., buttons or icons of data objects) of user interface elements and data objects can be presented in a container object (e.g., an application window, a finder window) as well.

In conventional GUIs, a user or application can select representations (e.g., icons) of items in a source container (e.g., the desktop or a folder window), move (e.g., drag) the selected item representations into a drop zone of a target container (e.g., an available area of the desktop or the window area of a folder window) using a pointer (e.g., a mouse cursor, a stylus or finger on a touch-sensitive display), and drop the selected item representations into the target container. After the drag and drop operation, the selected item representations can be moved from the source container to the target container on the user interface. In the file system, the items corresponding to the selected representations are moved from a location associated with the source container to another location associated with the target container in the file system hierarchy.

In conventional GUIs, when the user drags the selected items in the user interface, the movement of the selected items as a whole can be illustrated as an image containing representations of the selected items being dragged along by the cursor or pointing device. The appearance and spatial relationship of the selected items are static within the image as the image is dragged from one location to another in the user interface. When the items are released after the image enters the drop zone of a target container (e.g., as indicated by a change in appearance of the target container), the image disappears into the target container indicating the completion of the move.

As disclosed herein, a user can select one or more items in a user interface, and while the items are selected, the user can initiate a defined operation (e.g., a drag operation) on the selected items by a movement of a cursor or pointing device. When the operation is initiated, an animation can be presented illustrating the representations (e.g., icons) of the selected items moving from their original locations toward a current location of the cursor or pointing device in the user interface and forming a cluster in proximity to the current location of the cursor or pointing device. Hereinafter, the term "pointer" will be used to describe cursors (e.g., mouse or trackball cursors) and pointing devices (e.g., finger or stylus on a touch-sensitive display).

In some implementations, as the user continues to move the pointer during the drag operation, the representations of the selected items can move as a cluster in the user interface following the pointer (e.g., a cursor in the user interface or the touch point of a finger or stylus on a touch-sensitive display). The individual movement of each item representation in the cluster can be independently represented in terms of path, speed, and acceleration relative to other item representations in the cluster. In some implementations, the item representations can trail behind the current location of the pointer at varying distances within the cluster.

Furthermore, in some implementations, the container objects displayed in the user interface can be associated with different appearance styles, and representations of items displayed within each container object can take on characteristic appearances according to the appearance style associated with the container object. Common appearance styles can include a large icon view, a small icon view, a list view, a column view, or a picture view, for example. Other appearance styles associated with application windows can be defined by the application programs providing the application windows, for example, through an API associated with the operating system. In addition to the appearance styles for individual item representations, each container object can also define a formation style for the selected item representations collectively. Example formation styles include a free-arranged layout, a keep-arranged layout, a cluster, etc.

In some implementations, when items are initially selected, the representations of the selected items can have respective first appearances according to the appearance style associated with the items' respective source containers. As the representations of the selected items form a cluster and are moved over the drop zones of different container objects in the user interface, the representations of the selected items in the cluster can take on different appearances depending on the appearance style associated with the container object over which the cluster of item representations is currently located. In some implementations, when the selected items in the cluster are over areas of ineligible drop target containers, the representations of the selected items in the cluster can take on appearances based on other appearance styles that are defined by the source container object for the ineligible drop target containers. The formation style of the selected items can also change according to a formation style defined by the source container for the ineligible drop target containers.

Figure 1B:
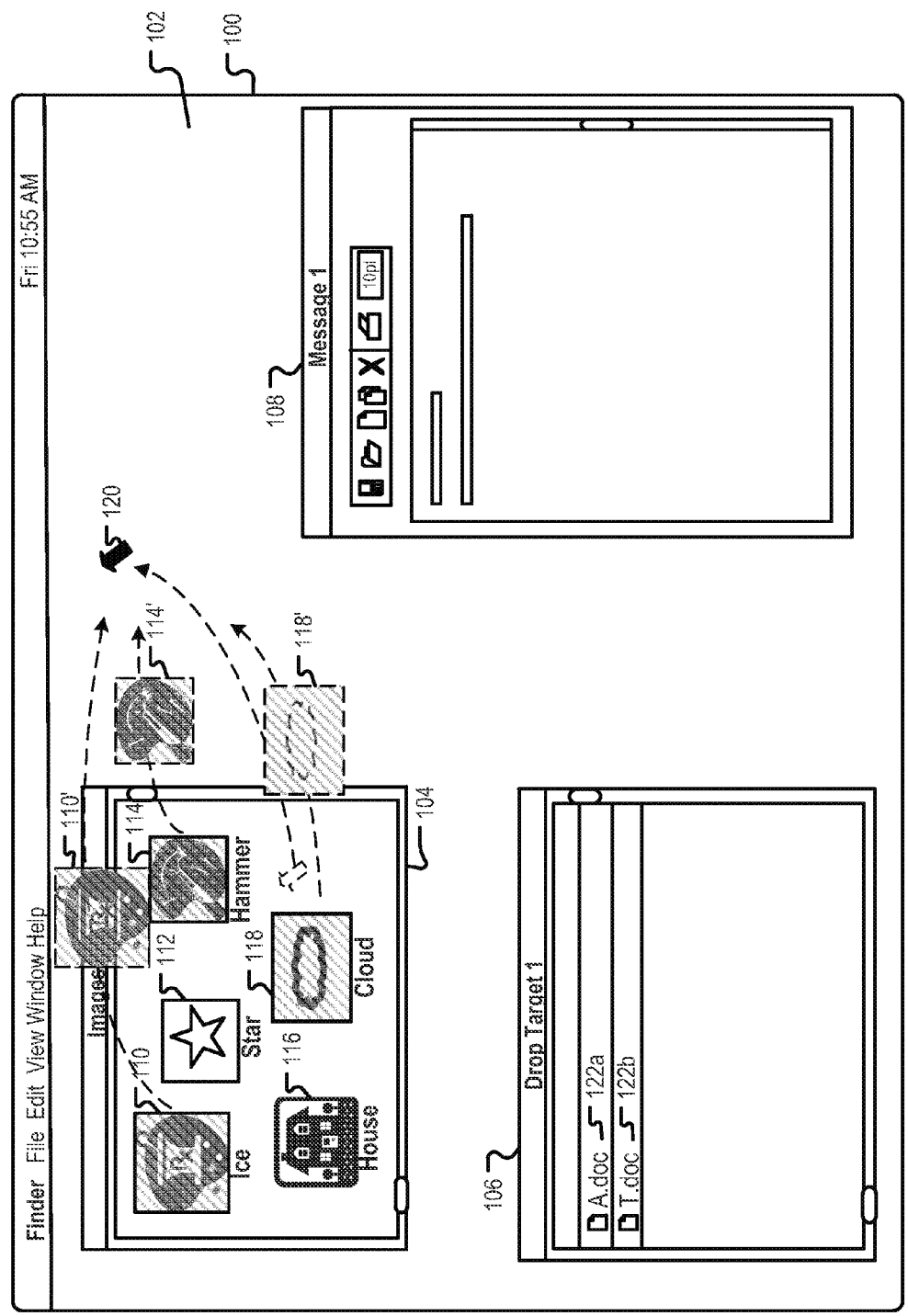
Figure 1C:
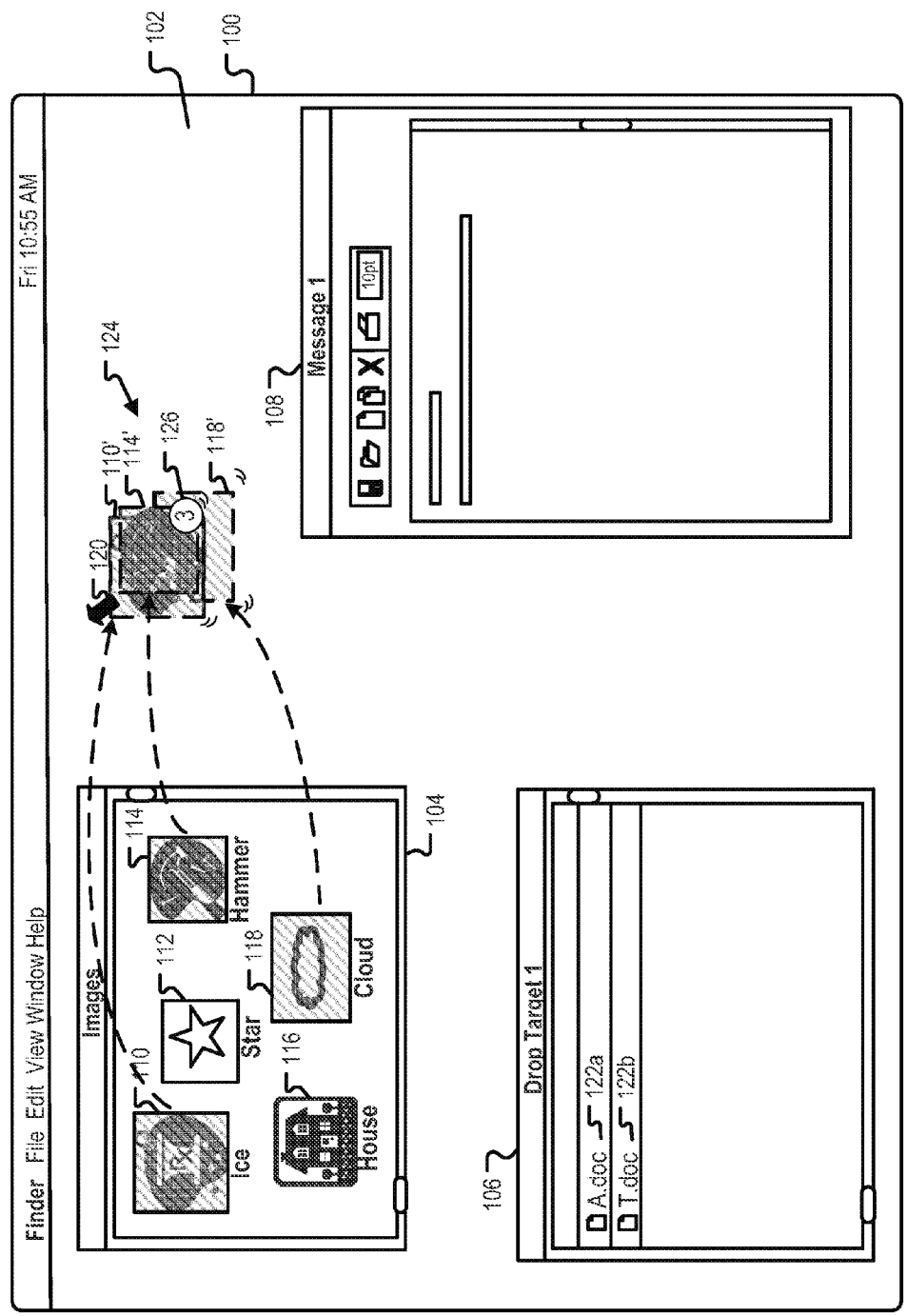

FIGS. 1A-1C illustrate exemplary user interface changes showing representations of multiple selected items moving toward a current location of a pointer and forming a cluster near the current location of the pointer in response to the initiation of a defined operation (e.g., a drag operation) on the selected items by the pointer.

In FIG. 1A, an exemplary user interface 100 is presented. The exemplary user interface 100 can be a desktop of an operating system. A number of container objects (e.g., a folder window 104, a folder window 106, and an application window 108) are displayed on the user interface 100, for example, within a display area 102 of the desktop.

As shown in FIG. 1A, the folder window 104 contains representations of items (e.g., item representations 110, 112,

114, 116, and 118) shown in a large icon view. In the large icon view, the representation of each item can include a thumbnail image showing a preview of the item's content and a text label showing the name of the item. For example, if the item is an image file, the representation of the item in the large icon view can be a scaled-down replica of the image file with a text label showing the filename of the image file. For another example, if the item is a folder, the representation of the item in the large icon view can be an enlarged folder icon revealing representative content of the folder on the surface of the enlarged folder icon, and a text label showing the name of the folder. Other appearance characteristics can be associated with the representations of items in the large icon view, such as size, transparency level, color scheme, etc.

In some implementations, a folder window can also be in a small icon view, where smaller icons representing the items can be displayed. The small icon representations of the items can include less visual information than the large icon representations of the items. For example, the small icon representation of an item can indicate the file type of the item (e.g., image file, text document, folder, etc.) but omit information on any specific content of the item. The large icon representation and the small icon representation of an item can both include a text label indicating the filename of the item. In some implementations, the text labels of an item's large icon representation and small icon representation can have different appearances.

In some implementations, the folder window (e.g., the folder window 104) in a large icon view (or a small icon view) can be in either a free-arranged state or a keep-arranged state. In the free-arranged state, the representations of items can be located at and moved to any coordinate locations in the display area of the folder window. In the keep-arranged state, the representations of items can be located on an evenly spaced grid, and sorted according to one or more keep-arranged criteria (e.g., by filename, by modification time, by size, by file type, etc.).

In some implementations, when the folder window is in a keep-arranged state, if new items are introduced into the folder window, or if the attributes associated with a keep-arranged criterion (e.g., a sorting criterion) are changed for one or more items in the folder window, the folder window can be updated to re-organize the items on the display area of the folder window according to the one or more keep-arranged criterion and the new values of the attributes.

In some implementations, the folder window (e.g., the folder window 104) may be resized, such that only a portion of the display area in the folder window is visible on the user interface 100. The user can use a scroll control to move the view port of the folder window to reveal the hidden portions of the display area or to enlarge the folder window to reveal more of the display area of the folder window.

As shown in FIG. 1A, the folder window 104 is currently shown in a large icon view and in a free-arranged state. The large icon representations of the items 110, 112, 114, 116, and 118 are located in the display area of the folder window 104 in a free-arranged configuration. Also, as shown in FIG. 1A, the user has selected the items 110, 114, and 118 (as indicated by the shading of the items 110, 114, and 118).

Also in FIG. 1A, the folder window 106 is currently shown in a list view. The folder window 106 represents a folder (e.g., folder "Drop Target 1") in the file system hierarchy. Items shown in the folder window 106 are items contained in the folder represented by the folder window 106. Representations of items (e.g., item representations 122*a* and 122*b*) shown in the folder window 106 can each include a small icon representing the item and a text label showing the filename of the item. The small icon of an item's list view representation can be the same as the graphical portion of the item's small icon representation, but the text labels in the list view representation and the small icon representation can be positioned differently in the two representations. For example, in the list view representation, the text label is located to the right of the small icon; while in the small icon representation, the text label is located below the small icon.

As shown in FIG. 1A, the item representations (e.g., the item representations 122*a* and 122*b*) within the list view folder window 106 can be sorted according to a keep-arranged criterion, such as by filename, by size, by modification time, by item type, and so on. In the folder window 106, the representations of the two items 122*a* and 122*b* are arranged according to their filenames.

Other than the large icon view, the small icon view, and the list view, folder windows can also be shown in a column view (not shown in FIG. 1A). A folder window in the column view can include one or more columns. Each column can correspond to a respective level in the file system hierarchy and be associated with a respective parent item from a parent level of the respective level in the file system hierarchy. Consecutive columns in the column view folder window correspond to consecutive levels of the file system hierarchy. Each column can present representations of items that are child items of a currently selected item in an adjacent column to the left of the column. The representations of items in a column view folder window can have similar appearances as the representations of the items in a list view folder window.

Other views of folder windows and application windows can be defined. The operating system can provide an application programming interface (API) that specify the various appearance characteristics that representations of items can have when presented in the folder windows and application windows in the various views. In some implementations, each view of the folder window can be specified with an appearance style which controls how individual item representation should appear in this view. Each appearance style can specify one or more layers for the different components of the item representations. For example, a respective layer can be defined for the icon image of an item representation, the text label of the item representation, and a background image of the item representation. Each layer can have associated properties that define how the component should appear and how the component can be animated during a transition to a different appearance style from the current appearance style.

FIG. 1A shows that the user has selected items 110, 114 and 118 in the folder window 104. The selection of the items can be accomplished by a pointer, a keyboard, another input device, or a combination of one or more of the above. The current location of the pointer can be indicated on the user interface 100 by a cursor (e.g., a cursor 120). In some implementations, where the pointer is a finger or stylus on a touch-sensitive display, no cursor need to be shown on the user interface 100, and the current location of the pointer is the touch point of the finger or stylus on the touch-sensitive display.

FIG. 1B illustrates the movement of the items' representations from their original locations in the folder window 104 toward the current location of the pointer after the initiation of the defined operation (e.g., the drag operation) is detected.

In some implementations, while the items remain selected in the user interface 100, the initiation of the defined operation (e.g., the drag operation) can be indicated by a movement of the pointer from a location inside the folder window 104 to another location outside of the folder window 104. In some implementations, the defined operation begins and continues when the pointer is moved while a hold button (e.g., the mouse button or the "SHIFT" key) remains pressed on an input device (e.g., the mouse or the keyboard). In some implementations, the initiation of the defined operation can be indicated by a movement of the pointer from one location to another location over a defined threshold distance, regardless of whether the second location is within or outside of the folder window 104. In some implementations, the hold button needs not be pressed during the defined operation.

As shown in FIG. 1B, after the initiation of the defined operation (e.g., the drag operation) is detected (e.g., as indicated by the current location of the cursor 120 outside of the folder window 104), an animation can be presented in the user interface 100 to illustrate the movement of the respective representations of the selected items from their original locations toward the current location of the pointer on the user interface 100. The movement of each item representation can be along a respective path (e.g., as indicated by the dashed curves) in the user interface 100. In some implementations, respective representations of the selected items (e.g., item representations 110, 114, and 118) can remain in their original locations in the folder window 104, while copies of the representations (e.g., item representations 110', 114' and 118') can be shown to be peeled off from the representations 110, 114, and 118 and moved toward the current location of the pointer along their respective paths.

In some implementations, the speed, acceleration, and path shape for each item representation (e.g., each of the item representations 110', 114', and 118') can be varied independently of one another. In some implementations, an item representation located closer to the starting location of the pointer (e.g., item representation 114') can be shown to take off earlier than an item representation located farther away from the starting location of the pointer (e.g., item representations 110' and 118') in the folder window 104.

In some implementations, the item representations can start their respective movement toward the current location of the pointer as soon as the pointer starts to move, and if the selected items are released before the current location of the pointer reaches the edge of the folder window 104, the representations of the selected items can be shown to move back to their original locations in the folder window 104 along their respective paths in the user interface 100.

In some implementations, the item representations (e.g., the item representations 110', 114', and 118') can be shown to start their respective movement at a slower and more uniform speed toward the current location of the pointer as soon as the pointer starts to move. And, as soon as the currently location of the pointer moves beyond the folder window 104 (or, alternatively, as soon as the pointer has moved beyond a threshold distance from its starting location in the folder window 104), the items' representations can be shown to move more rapidly (or accelerate) toward the current location of the pointer, and form a cluster in proximity to the current location of the pointer.

In some implementations, when the pointer moves within the folder window 104, the representations of the selected items can follow the movement of the pointer as a static image, where the spatial relationship between the selected items do not vary during the movement. And, as soon as the pointer moves outside of the folder window 104, the representations of the selected items can be shown to move toward (or "flock to") the current location of the pointer along their respective paths and form a cluster in proximity to the current location of the pointer.

In some implementations, the formation of the item representations (e.g., the cluster) can be defined by the source container object (e.g., the folder window 104) through the API. The animation style showing the respective movement (e.g., path shape, speed, acceleration) of the item representations from their respective original locations to their respective locations in the formation (e.g., the cluster) can also be defined by the source container through the API. In some implementations, the appearance style and the formation style of the item representations can be determined jointly by the source container and the potential drop target container.

As shown in FIG. 1C, the respective representations of the selected items (representations 110', 114' and 118') have reached their respective locations in proximity to the current location of the pointer (e.g., as indicated by the cursor 120), and formed a cluster 124 in proximity to the current location of the pointer. In some implementations, the representations of the items can arrive at the cluster 124 at different times.

In some implementations, as shown in FIG. 1C, the cluster 124 formed by the representations of the selected items is a stack containing the representations of the selected items (e.g., the item representations 110', 114', and 118'). In some implementations, the order of the items' representations in the stack can be dependent on the order by which the representations had arrived in the stack, which indirectly can depend on the respective distance between each item's original location in the folder window 104 and the starting location of the pointer in the folder window 104. In some implementations, the order of the items' representations in the stack can depend on the order by which the items had been selected in the folder window 104. In some implementations, other orderings (e.g., random order) of the items' representations in the cluster 124 are also possible. In some implementations, the order of the items' representations can be defined in a formation style associated with the potential drop target (e.g., the desktop). In some implementations, the order of the items' representations can be defined in a formation style associated with the source container (e.g., the folder window 104).

In some implementations, the items' representations do not have to form a stack in the cluster 124. Other arrangements of the items in the cluster 124 are possible. For example, if the number of item representations in the cluster is small, the items can be laid out on a grid or along a curved path (e.g., in a circle) in proximity to the current location of the pointer. In some implementations, if the items' representations overlap in the cluster, the items' representations in the cluster can be temporarily spread out to eliminate the overlapping in response to a predefined input command (e.g., an expansion command). The different formation styles or arrangements can be defined with different trigger events, such as the number of items in the formation, the current location of the pointer, and so on. The different formation styles can be used to arrange the item representations when their corresponding trigger events are detected in the user interface.

In some implementations, after the items' representations (e.g., the item representations 110', 114', and 118') have formed a cluster 124 in proximity to the current location of the pointer (e.g., as indicated by the cursor 120), the item representations can move independently within a defined range in the cluster 124. For example, each item representation 110', 114', and 118' can be shown to move near the current location of the pointer in the cluster 124 in a manner as if the item representations 110', 114' and 118' are floating in water and are being rocked by the currents in the water.

In some implementations, a count indicator 126 can be presented in proximity to or attached to the cluster 124. The count indicator 126 can show a numeral indicating the number of item representations that have gathered in the cluster

124. As shown in FIG. 1C, three item representations (e.g., item representations 110', 114' and 118') have gathered near the current location of the pointer and formed the cluster 124, and the count indicator 126 attached to the cluster 124 shows the number "3." In some implementations, the count indicator can be defined in its own layer in the cluster, and be animated independently of the item representations in the cluster. The source container can provide the formation style for the cluster, and the formation style can specify how the item representations are to be laid out in the cluster.

As shown in FIG. 1C, the current location of the pointer is on the display area 102 of the desktop. The desktop itself can be a container displaying representations of items (e.g., icons for files and folder in the desktop folder) in the display area 102 of the desktop. The desktop can present items in a large icon view or a small icon view, and the representations of items in the desktop can be in a free-arranged configuration or a keep-arranged configuration.

In this example, the desktop is in a large icon view. Therefore, when the items' representations move from the folder window 104 to the current location of the pointer on the desktop, the appearance of the item representations are not altered when they form the cluster 124 on the desktop. However, if the desktop were in a small icon view, the item representations can be changed from their original large icon appearances (as shown in the folder window 104) to their small icon appearances when the item representations are clustered on the desktop.

In some implementations, before the dragged items are released (e.g., by the releasing of the hold button on the pointer or the keyboard, or by lifting the finger away from the touch-sensitive display), the item representations can follow the movement of the pointer in the user interface 100 in a cluster (e.g., the cluster 124).

Figure 1D:
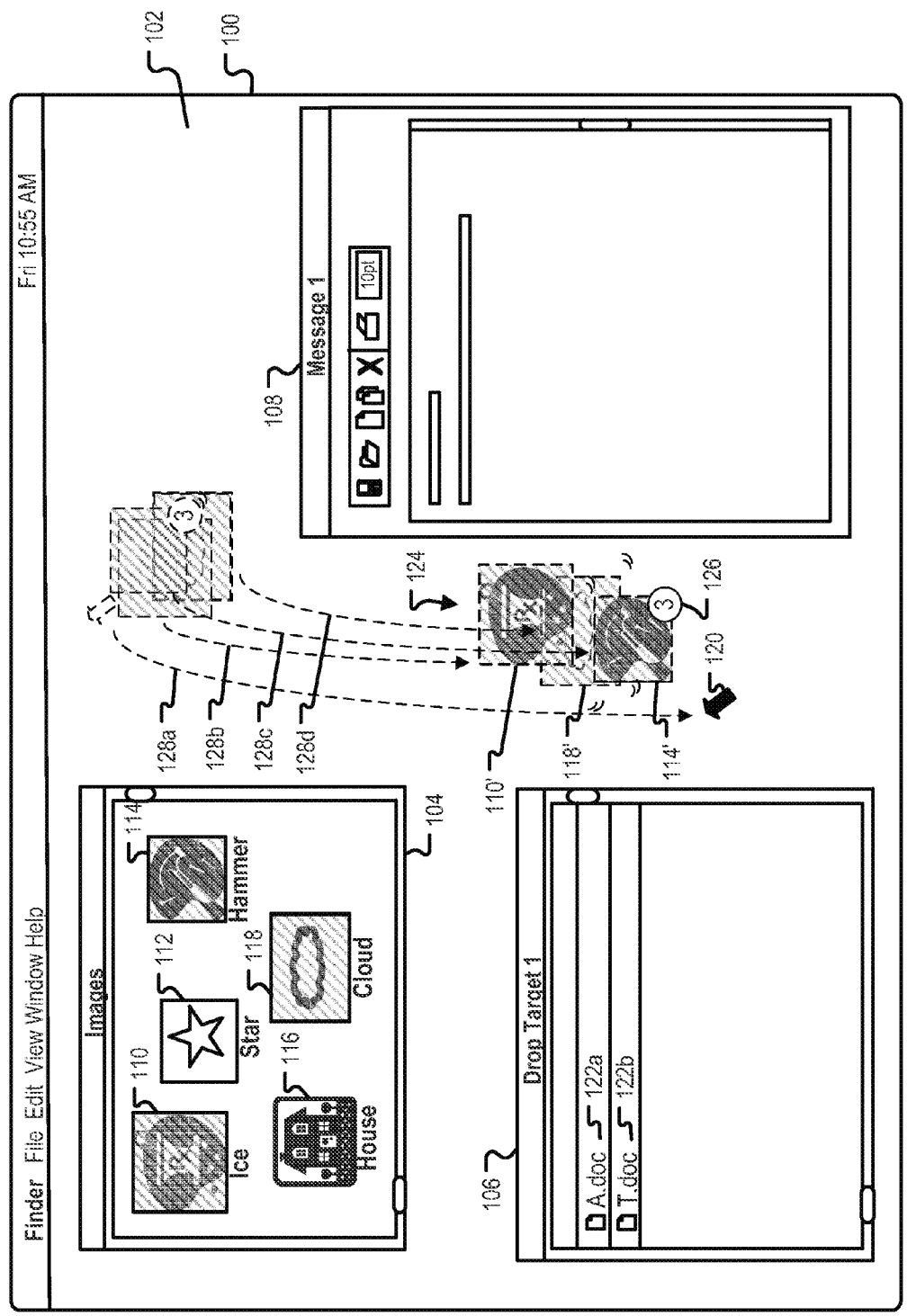
FIG. 1D illustrates exemplary user interface changes showing movement of the cluster of item representations following the movement of the pointer in the user interface.

As shown in FIG. 1D, as the current location (e.g., as indicated by the cursor 120) of the pointer are moved along a path (e.g., as indicated by the dashed curve 128*a*) in the user interface 100 (e.g., within the display area 102 of the desktop), the item representations in the cluster 124 follow the movement of the pointer along the representations' respective paths (as indicated by the dashed curves 128*b-d*).

In some implementations, the item representations in the cluster 124 can moved at different speeds and with different accelerations, and trail behind the cursor 120 by different distances. In some implementations, when the pointer is stopped in the user interface 100 (e.g., at the end of curved path 128*a* in the direction of the arrow), each item representation in the cluster 124 can be shown to decelerate when the item representation arrives at a location in proximity to the stop location of the pointer in the user interface 100.

Figure 1E:
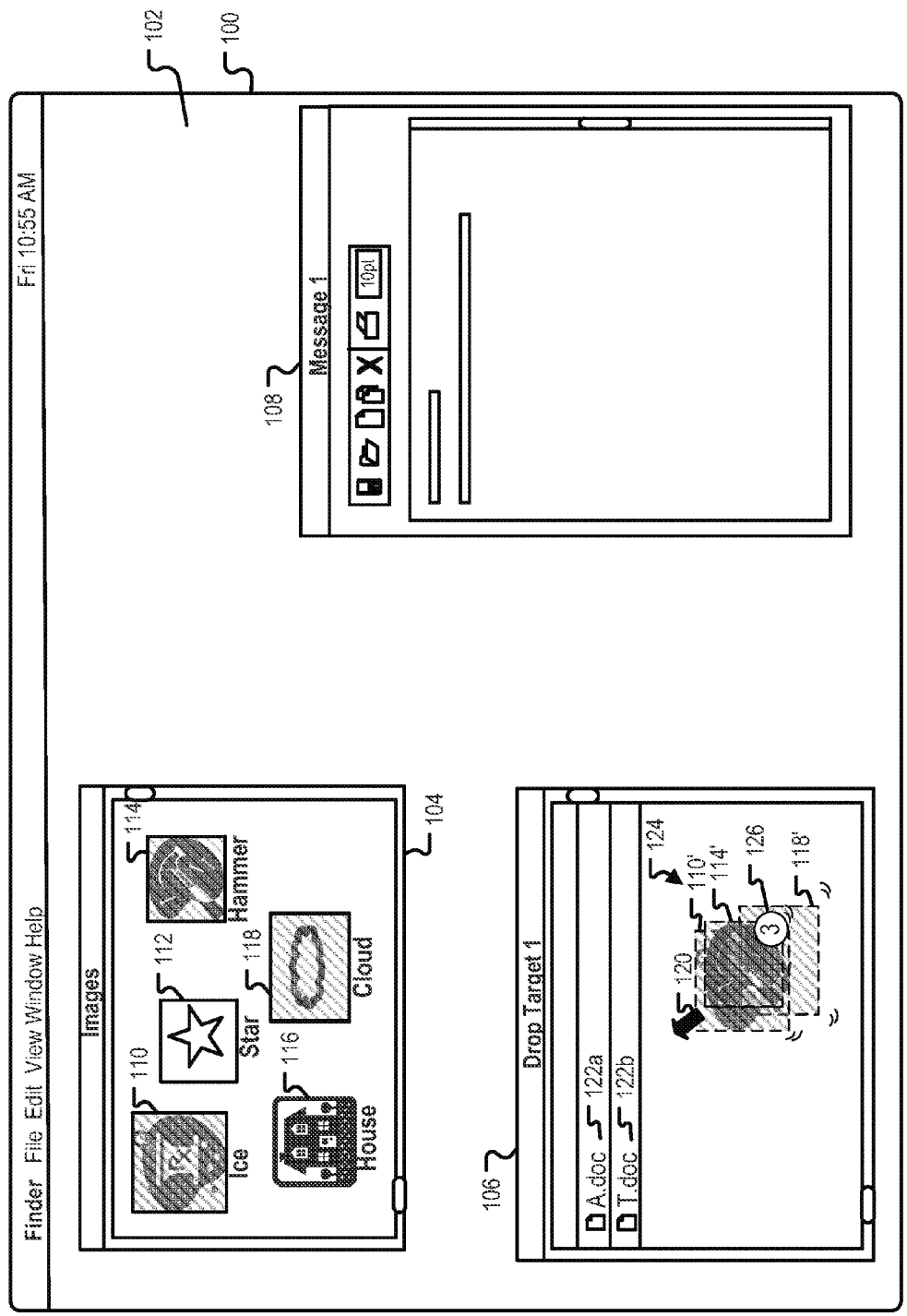
FIGS. 1E-1F illustrate exemplary user interface changes showing the item representations in the cluster changing their appearances according to the appearance style of a potential target container while the cluster is within the drop zone of the potential target container.
Figure 1F:
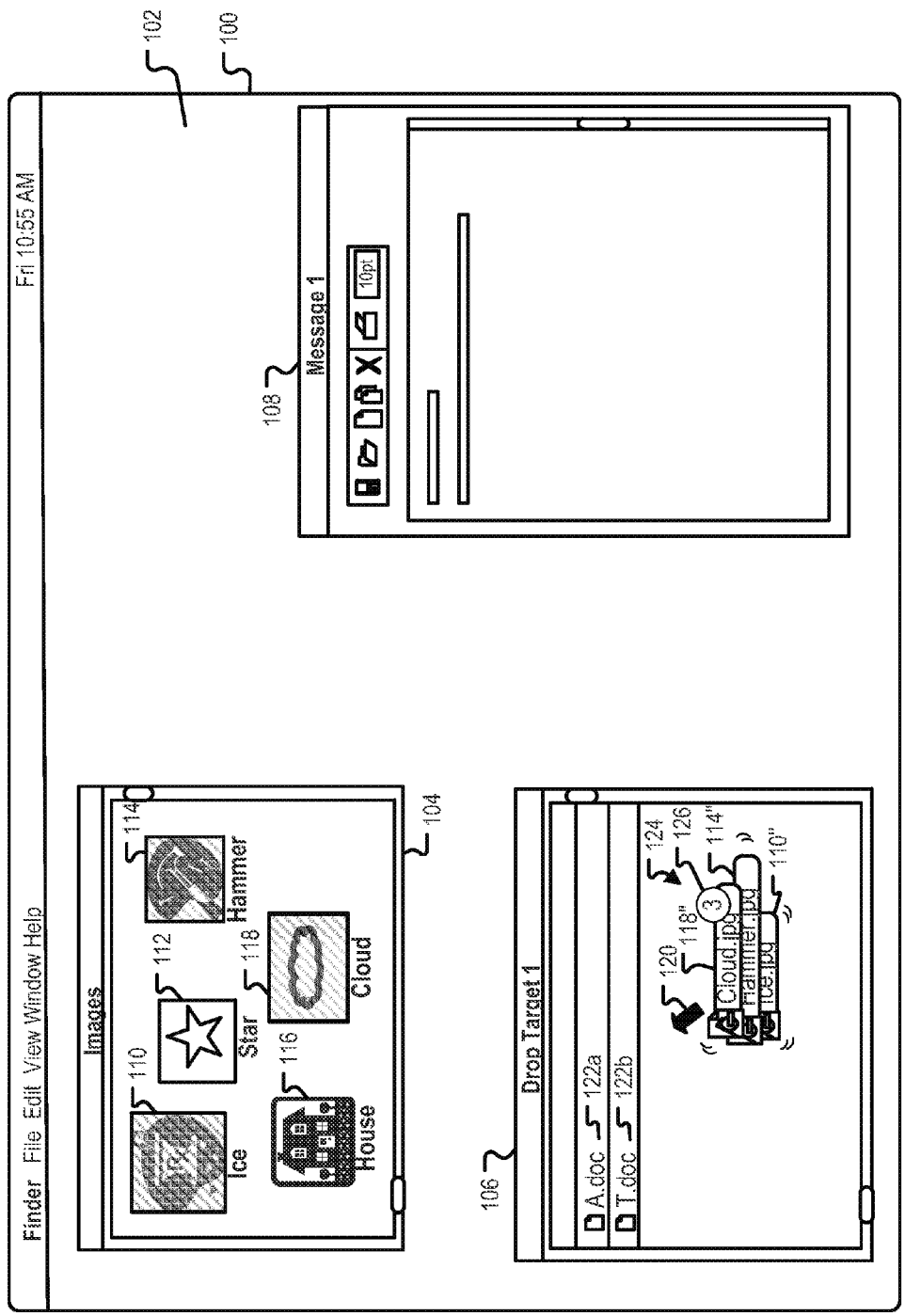

FIGS. 1E-1F illustrate exemplary user interface changes showing the representations of the selected items in the cluster changing their appearances according to the appearance style of a potential target container while the cluster is within the drop zone of the potential target container.

Continuing with the example shown in FIGS. 1A-1D, if the user continues the dragging operation on the selected item representations 110', 114', and 118', the cluster 124 formed by the item representations 110', 114' and 118' can follow the movement of the pointer into the folder window 106 (as shown in FIG. 1E). When the cluster 124 initially enters the folder window 106, the appearances of the item representations in the cluster 124 can be the same as the appearances of the item representations in the cluster 124 when the cluster 124 was in the display area 102 of the desktop.

In some implementations, if the cluster 124 is dragged across the folder window 106 quickly without stopping or slowing down, the appearances of the item representations in the cluster 124 do not need to change. In some implementations, the operating system can monitor the motion pattern of the pointer as the cluster 124 is dragged from location to location on the user interface 100. If the motion pattern of the pointer over a container object (e.g., a folder window, an application window, or the desktop) is indicative of the user's consideration of the container object as a potential target container for the selected items in the cluster 124, the change in appearance for the item representations in the cluster 124 can be carried out. If the motion pattern of the pointer over a container object indicates that the user is merely passing over the container object on the way to another location on the user interface, the change in appearance for the item representations in the cluster 124 are not initiated.

In some implementations, the characteristics in the motion pattern that are indicative of the user's consideration of a container as a potential target container for the selected items in the cluster 124 can include a slow-down of the pointer after the pointer has entered the container or a pause of the pointer inside the container for more than a threshold amount of time (e.g., hovering). In some implementations, the characteristics in the motion pattern indicating that the user is merely moving the pointer over a container to another location in the user interface 100 can include a fast and smooth movement of the pointer over the container without any slowing-down.

In some implementations, as shown in FIG. 1F, when the pointer slows down or pauses inside the folder window 106, the appearances of the item representations in the cluster 124 can change from the large icon view associated with the desktop to the list view associated with the folder window 106. For example, the representations 110', 114' and 118' of the selected items are the items' large icon representations, and in FIG. 1F, the large icon representations 110', 114' and 118' in the cluster 124 have been replaced by the representations 110", 114", and 118" which are the list view representations of the selected items 110, 114, and 118, respectively.

As shown in FIG. 1F, each of the list view representations 110", 114", and 118" of the selected items in the cluster 124 can include a small icon and a text label. In some implementations, the list view representations in the cluster 124 can be sorted in the cluster 124 according to the keep-arranged criterion (e.g., by filename, by size, by file type, by modification time, etc.) of the folder window 106. In some implementations, the order of the list view representations 110", 114", and 118" in the cluster 124 can be kept the same before and after the change in appearance has occurred.

In some implementations, an animation can be presented to illustrate the transition of the item representations from their large icon appearances in the cluster to their list view appearances in the cluster. Different animations can be applied to different layers (e.g., the icon image layer and the text label layer) of the item representations. For example, an animation can be applied to the icon image layer illustrating the large icon image of an item representation shrinking into a small icon image of the item representation. At the same time, another animation can be applied to the text label layer illustrating the text label of the item representation moving from the bottom of the large icon image to the right side of the small icon image. In addition, the appearance of the text label itself can be changed as well during the animation. For example, a border can be added around the text label, and the color and font of the text label can be changed as well.

Figure 1G:
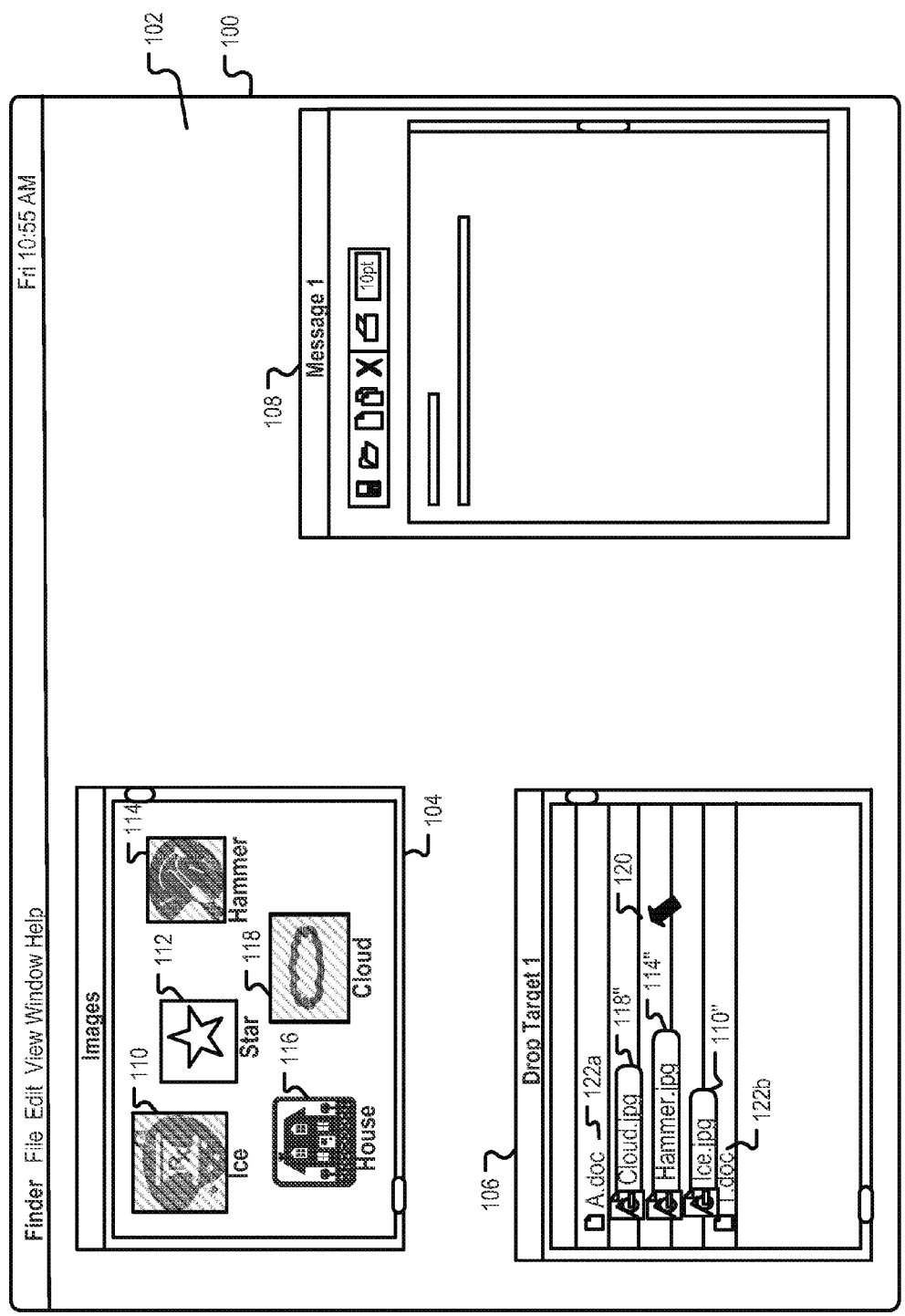
FIG. 1G illustrates exemplary user interface changes showing the item representations departing from the cluster and moving toward their respective anticipated locations in the potential target container as a preview of the container's configuration if the selected items were to be dropped into the potential target container.

FIG. 1G illustrates exemplary user interface changes showing the representations of the selected items departing from the cluster 124 and moving toward their respective anticipated locations in the potential target container (e.g., the folder window 106) as a preview of the container's configuration if the selected items were to be dropped into the potential target container (e.g., the folder window 106).

In some implementations, when the user pauses the pointer inside a container (e.g., the folder window 106) for a prolonged period of time (e.g., more than a minimum threshold time period), or when the user enters a predefined preview command, an animation can be shown in the user interface 100 illustrating the item representations (e.g., item representations 110", 114", and 118") in the cluster 124 departing from their original locations in the cluster 124 and moving toward their respective anticipated locations if the items were to be released into the container (e.g., the folder window 106).

In some implementations, the anticipated locations of the item representations can be determined according to the keep-arranged criteria (e.g., sorting by filename, file size, file type, modification time, etc.) associated with the container (e.g., the folder window 106) and the relevant attribute values (e.g., filenames, file sizes, files types, modification times, etc.) of the selected items in the cluster and the existing items in the container. For example, the selected items 110, 114, and 118 and the existing items 122*a* and 122*b*, when sorted by their respective filenames, would have the following order: (1) item 122*a*, (2) item 118, (3) item 114, (4) item 110, and (5) item 122*b*. Based on this order, the anticipated locations of the item representations 110", 114", and 118" in the folder window 106 can be determined.

As shown in FIG. 1G, the item representations 110", 114", and 118" have departed from the cluster 124 and moved to the respective anticipated locations that the item representations would have in the folder window 106 if the selected items were to be dropped into the folder window 106. In some implementations, representations of existing items (e.g., item representations 122*a* and 122*b*) can be moved in the folder window 106 to make room for the representations of the selected items in the clusters 124.

In some implementations, the item representations (e.g., item representations 110", 114", and 118") from the cluster 124 can be displayed at their anticipated locations in the potential target container (e.g., the folder window 106). In some implementations, the item representations (e.g., item representations 110", 114", and 118") can be displayed in proximity to their anticipated locations in the potential target container (e.g., the folder window 106).

In some implementations, when the representations of the selected items are presented at or in proximity to their anticipated locations in the potential target container, the representations can be displayed as semi-transparent overlays on the user interface. In some implementations, other visual indications can be provided in the item representations when the item representations are presented at or in proximity to their anticipated locations during the preview.

In some implementations, after the item representations (e.g., item representations 110", 114", and 118") in the cluster 124 have departed from the cluster and moved to the respective anticipated locations of the representations in the potential target container (e.g., the folder window 106), if the user then chooses to drop the selected items into the potential target container, the respective representations of the selected items (e.g., the representations 110", 114", and 118") can be shown to move (if they are not already displayed at their respective anticipated locations) and settle into their respective anticipated locations and change from a first state (e.g., a semi-transparent state) to a second state (e.g., an opaque state). In some implementations, other appearance characteristics indicating the transitory state of the item representations during the preview can be removed when the item representations are dropped into the potential target container.

Figure 1H:
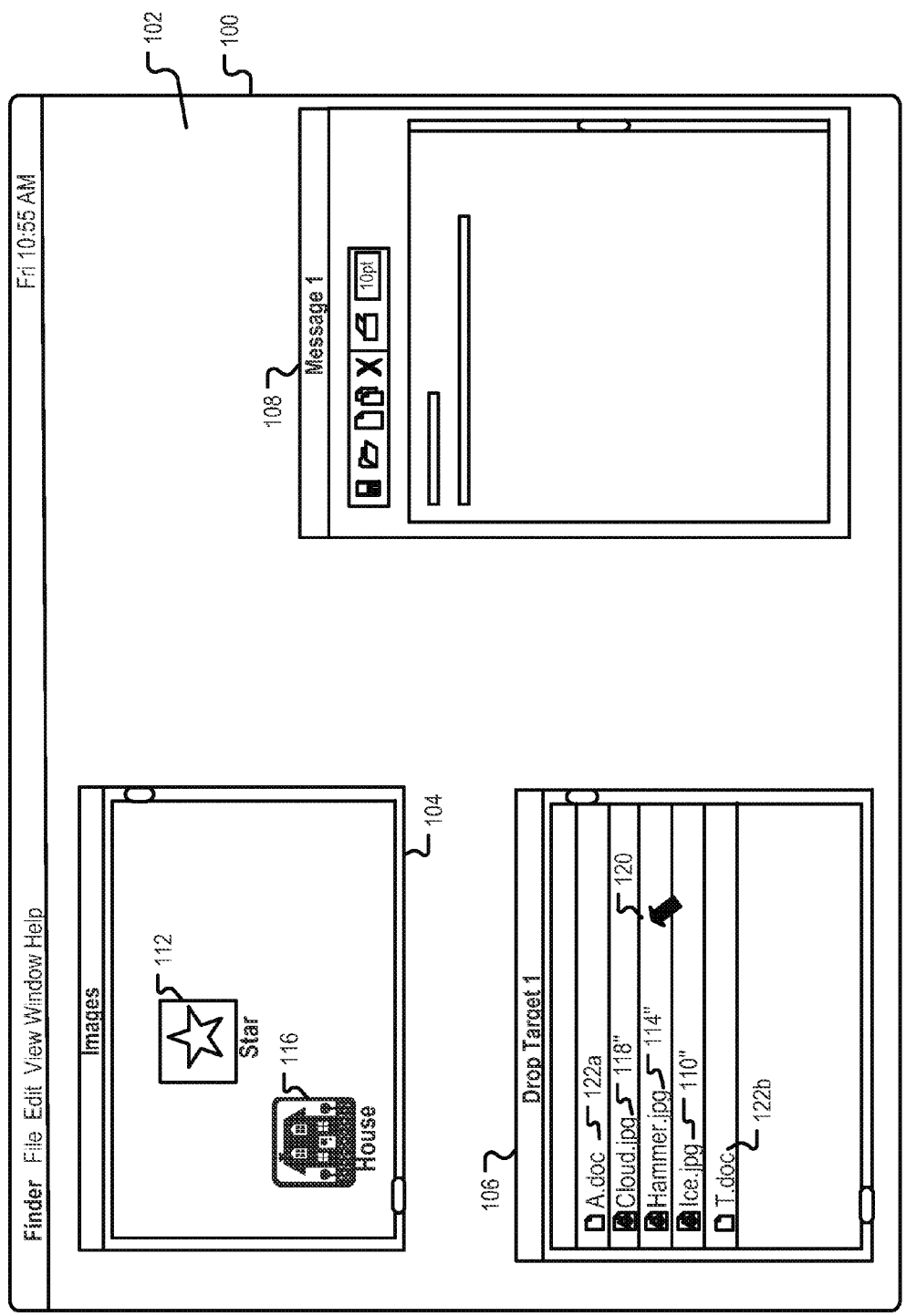
FIG. 1H illustrates exemplary user interface changes showing the representations of the selected items settling into their respective anticipated locations when the selected items are released or dropped into the potential target container.

FIG. 1H illustrates exemplary user interface changes showing that the representations of the selected items have settled into their respective anticipated locations when the items are dropped into the potential target container (e.g., the folder window 106).

In some implementations, as shown in FIG. 1H, at the completion of the drop operation, the representations of the selected items in their respective list view appearances have been inserted into the folder window 106 at their respective anticipated locations shown during the preview in FIG. 1G. At the completion of the drop, the representations of the selected items in the folder window 104 can be removed from the user interface 100, as also shown in FIG. 1H. In the above example, the drag and drop operation is performed on the selected items, and the drag and drop causes a move of the selected items in the file system. In some implementations, the drag and drop operation can also be performed on copies of the selected items, and the representations of the selected items can be left in the folder window 104 and returned to their regular large icon view (e.g., without the shading shown in FIG. 1A) after the drag and drop.

In some implementations, the user can drop the selected items into a potential target container without waiting for the preview of the items at their anticipated locations to be presented. For example, the user can release the items immediately after the pointer is moved into the drop zone of the potential target container. For example, the drop operation can be initiated when the user interface 100 is in the state as shown in FIG. 1E. Alternatively, the user can release the items after the items have changed their appearances from the large icon view to the list view. For example, the drop operation can be initiated when the user interface 100 is in the state as shown in FIG. 1F. When the items are released, the items' representations can be shown to move from their respective current locations toward their anticipated locations along the items' respective paths and finally settle at the items' anticipated locations, as shown in FIG. 1H.

Figure 1I:
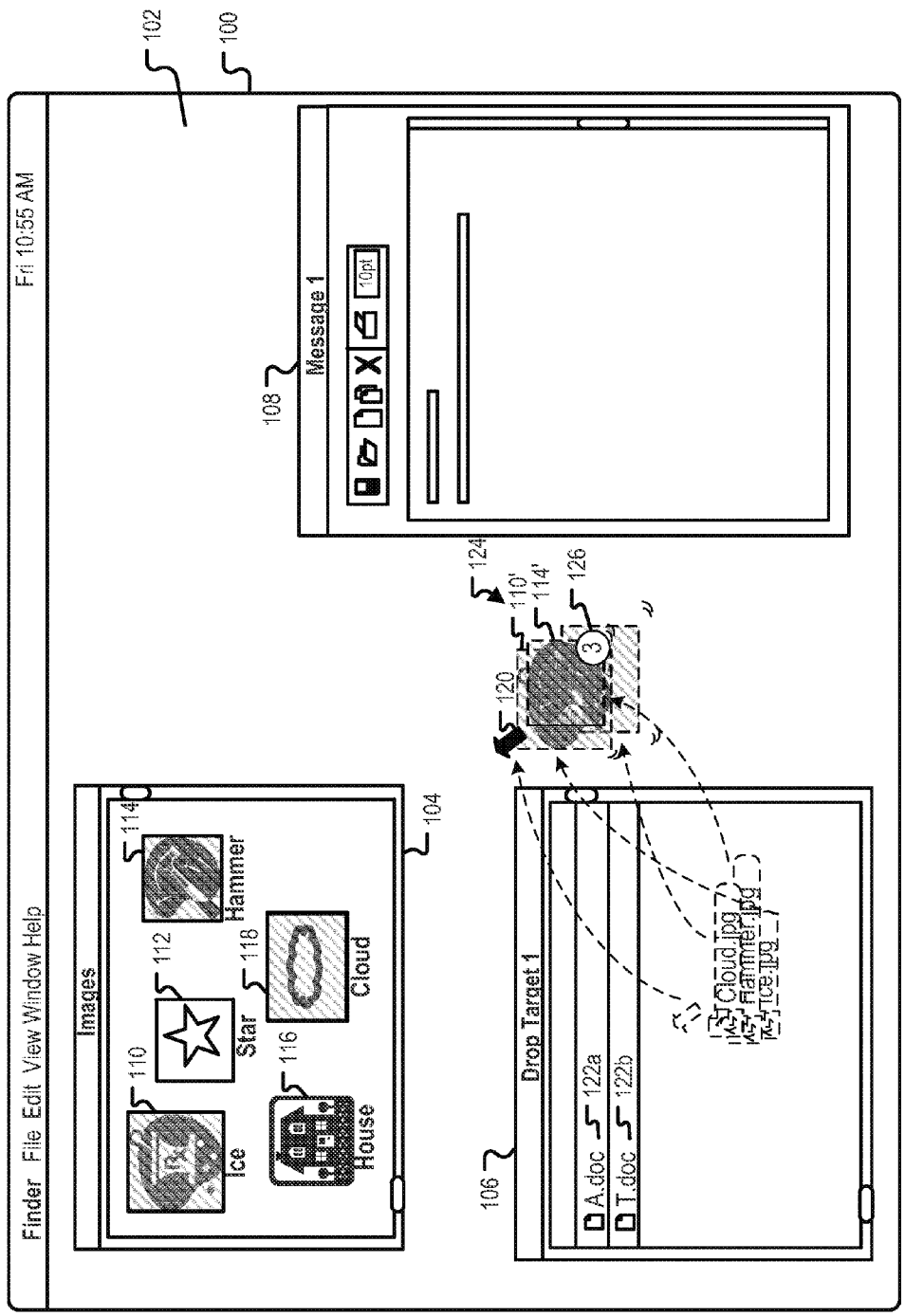
FIG. 1I illustrates exemplary user interface changes showing the cluster of item representations departing from the potential target container following the movement of the pointer (e.g., the user decided not to drop the selected items into the potential target container).

FIG. 1I illustrates exemplary user interface changes showing the cluster of item representations departing from the potential target container following the movement of the pointer (e.g., the user decided not to drop the selected items into the potential target container following the state shown in FIGS. 1F and 1G).

In some implementations, if the user decides not to release the item representations (e.g., the item representations 110", 114", and 118") into the potential target container (e.g., the folder window 106), and moves the pointer to a different location in the user interface 100 (e.g., out of the folder window 106), the item representations can be shown to dislodge from their respective anticipated locations in the folder window 106, and move toward the current location of the pointer to rejoin the cluster 124 in proximity to the current location of the pointer.

As shown in FIG. 1I, as the pointer is moved out of the potential target container (e.g., the folder window 106), the cluster 124 follows the cursor 120 of the pointer. In addition, when the cluster 124 is on the display area 102 of the desktop, the item representations in the cluster 124 can change from their respective list view appearances to their respective large icon view appearances.

Figure 1J:
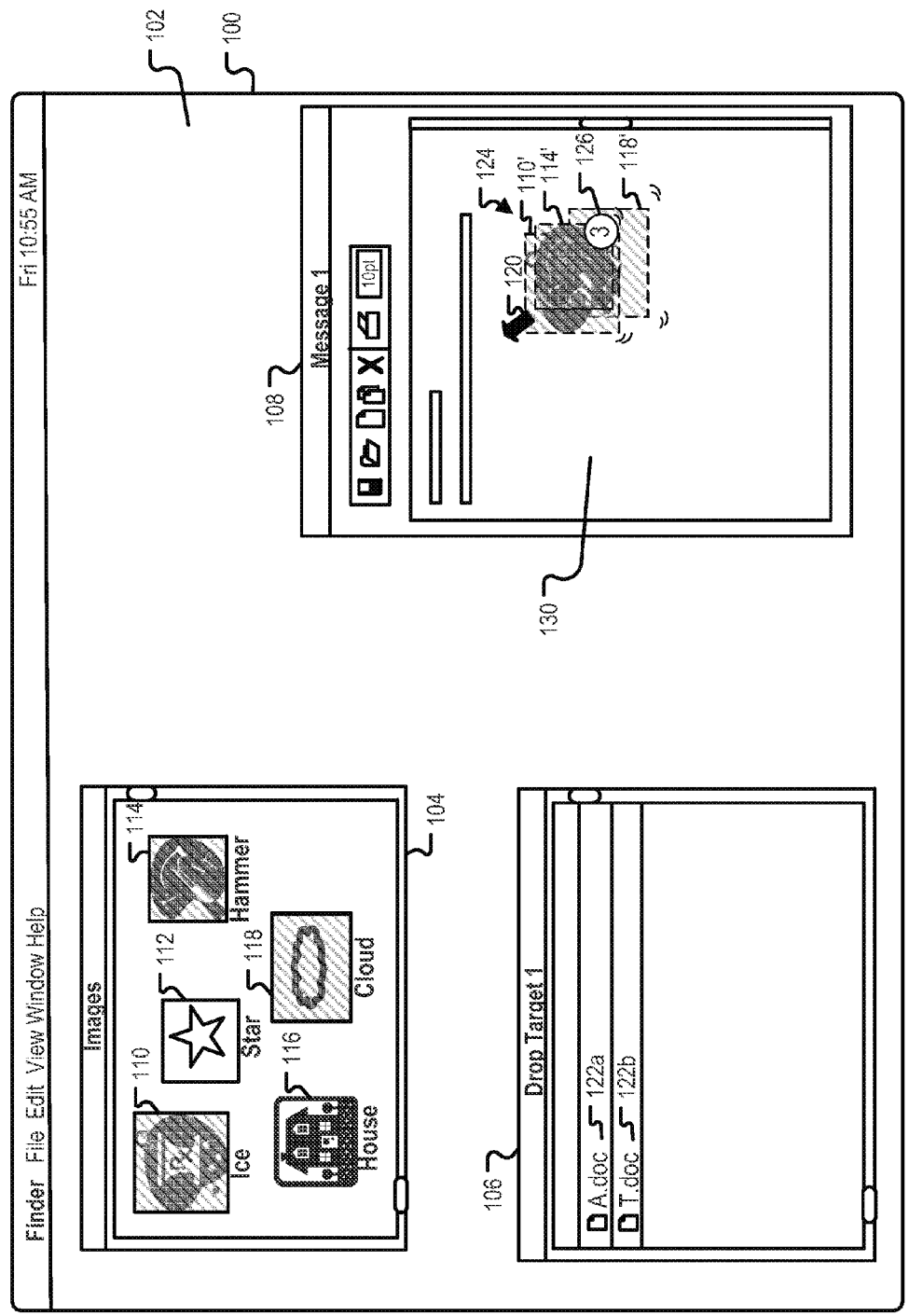

FIGS. 1J-1K illustrate exemplary user interface changes showing the cluster of item representations being dragged into a second potential target container (e.g., the application window 108) associated with an application-defined appearance style and the cluster of item representations changing their appearances according to the application-defined appearance style of the second potential target container.

Continuing with the example shown in FIGS. 1A-1I, suppose the user did not release the selected items into the folder window 106, and has dragged the cluster of selected items into the application window 108. The application window 108 can present an existing or new document 130, and the document 130 is ready to be edited. The application window 108 can be provided by a corresponding software application. In some implementations, the software application can define how content items (e.g., image files, video clips, data objects, etc.) can be presented in a document when the document is shown in an application window provided by the software application. In some implementations, the software application can communicate with the operating system through an application programming interface (API) to provide the necessary information (e.g., location, size, resolution, and format of the content items in the application-defined appearance style) for the operating system to implement the changes in appearance for item representations when the item representations are being dragging in and out of the application window 108.

In some implementations, the application can specify multiple layers in the appearance style of the item representation. Each layer can correspond to a component in the item representation (e.g., the icon image, the text label, and a background image). Each layer can be associated with its own properties, such as properties that specify the size, color, location of the component, and the animation style of the component when transitioning between appearance styles. Each layer can also be associated with a layer name or key name. For example, the layer showing the text label of an item representation can be given a key name "Label," while a layer showing the icon image of the item representation can be given a key name "Icon." The key names of the layers can be used by the operating system to identify the layers in a collection of item representations (e.g., in the cluster) for which special appearance and/or animation can be applied. For example, the operating system can identify all the "Label" layers in the item representations in the cluster, and make all or some (e.g., all but one) of the text labels in the item representations fade out when the item representations have arrived in the cluster.

In the example shown in FIG. 1J, the software application providing the application window 108 is an email editor, and the document presented in the application window 108 is an email message (e.g., "Message 1") that is being edited. The document currently includes some text, but no other content item has been embedded in the document. The software application supports dragging and dropping content items into an insertion point in the document 130.

When the user has dragged the cluster 124 containing the representations of the selected items (e.g., the representations 110', 114', and 118') into the application window 108, initially, the representations can maintain their large icon appearances, as shown in FIG. 1J. The operating system can monitor the motion characteristics of the user's pointer and determine whether the cluster 124 is merely being dragged over the application window 108 in passing, or whether the user is considering the application window 108 as a potential target container for the selected items in the cluster 124.

For example, the operating system can monitor the speed by which the cluster 124 has been dragged into the application window 108, and whether the pointer is currently stopped within the application window 108. If the pointer has slowed down significantly or has stopped within the application window 108, the operating system can decide to change the appearance of the item representations in the cluster 124 according to the appearance style associated with the application window 108. If the operating system determines that the pointer is moving through the application window 108 without any significant slowing-down or stopping, the operation system can keep the appearance of the item representations in the cluster as is, until a significant change in the motion pattern has been detected.

In this example, the user has stopped the pointer in the application window 108. When the operating system has detected the stopping of the pointer within the application window 108, the appearances of the item representations in the cluster can be changed from their large icon appearances (e.g., as representations 110', 114', and 118') to their picture view appearances (e.g., as representations 110''', 114''', and 118'''). The picture view appearances of the selected item can be defined by the application program according to how the item would appear if inserted into the document 130. For example, if the selected items are image files, and when the images files are inserted into the email message shown in the application window 108, the image are resized to have a uniform lateral size of half the page width. The appearance style of the application window 108 can be provided to the operating system through one or more API calls, and the operating system can generate the picture view representations of the selected items according to the appearance style of the application window 108. After the picture view representations (e.g., representations 110''', 114''' and 118''') of the selected items have been generated, the picture view representations can be presented in the cluster 124, replacing the large icon representations of the selected items, as shown in FIG. 1K.

In some implementations, the picture view representations of the image files can be a reduced image with less resolution or color information. In some implementations, the picture view representation can be semi-transparent. The software application can define other appearance styles associated with various views of the content items, and the item representations can be generated by the operating system according to the definition of the appearance style provided by the software application for the application window.

Figure 1L:
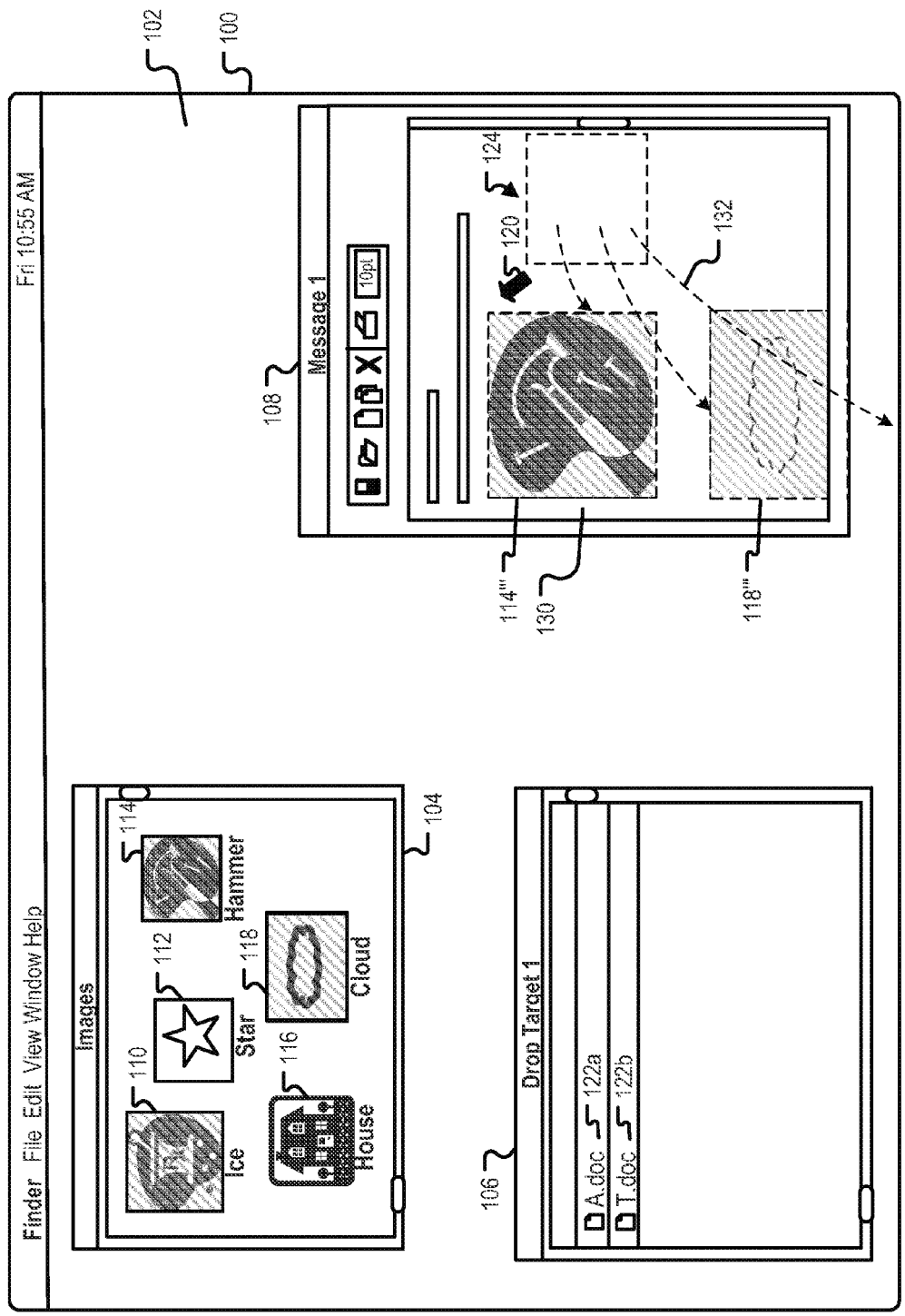
FIG. 1L illustrates exemplary user interface changes showing the representations of the selected items departing from the cluster and moving toward their respective anticipated locations in the second potential target container as a preview of the container's configuration if the selected items were to be dropped into the second potential target container.

FIG. 1L illustrates exemplary user interface changes showing the representations of the selected items (e.g., item representations 110''', 114''', and 118''') departing from the cluster 124 and moving toward their respective anticipated locations in the second potential target container (e.g., the application window 108) as a preview of the container's configuration if the selected items were to be dropped into the second potential target container.

As shown in FIG. 1L, each item representation in the cluster 124 can move toward its respective anticipated locations in the potential target container along a respective path. The anticipated locations of the items' representations can be determined according to the content of the document and the specifications of the application program providing the application window 108. For example, the application program providing the application window 108 can specify the order and layout by which the selected items can be inserted into the document 130 and provide the specifications to the operating system through an API. The operating system can implement the user interface changes illustrating the movement of the item representations to their respective anticipated locations in the document 130 in the application window 108.

In some scenarios, the application window can be of a limited size, and the document 130 cannot be fully revealed within the view port of the application window 108. The user can either increase the size of the application window 108 or to use a scroll control to move the hidden portions of the document 130 into the view port of the application window 108. When the anticipated locations are determined for the item representations in the cluster 124, the anticipated locations of some item representations may be in areas of the document 130 that are not currently visible in the application window 108. In such scenarios, the representations of these items can be shown to depart from the cluster 124, and move toward their respected locations along a respective path. The item representations can be shown to exit the visible area of the application window 108 along a trajectory leading to the anticipated locations that are not currently visible in the application window 108.

For example, as shown in FIG. 1L, the anticipated location of the item representation 118''' is partially within the visible area of the application window 108. During a preview of the item representations at their anticipated locations, an animation can be presented showing the item representation 118''' moving partially into the invisible area of the document. Similarly, the anticipated location of the item representation 110''' is completely outside of the visible area of the application window 108, and during the preview, the animation can show the movement of the item representation 110''' along the path 132 into the invisible area of the application window 108. By showing the animation, the user can make the mental note that the item representation 110''' has not simply disappeared, but is located at an insertion point in the document 130 below the image representation 118'''.

Figure 1M:
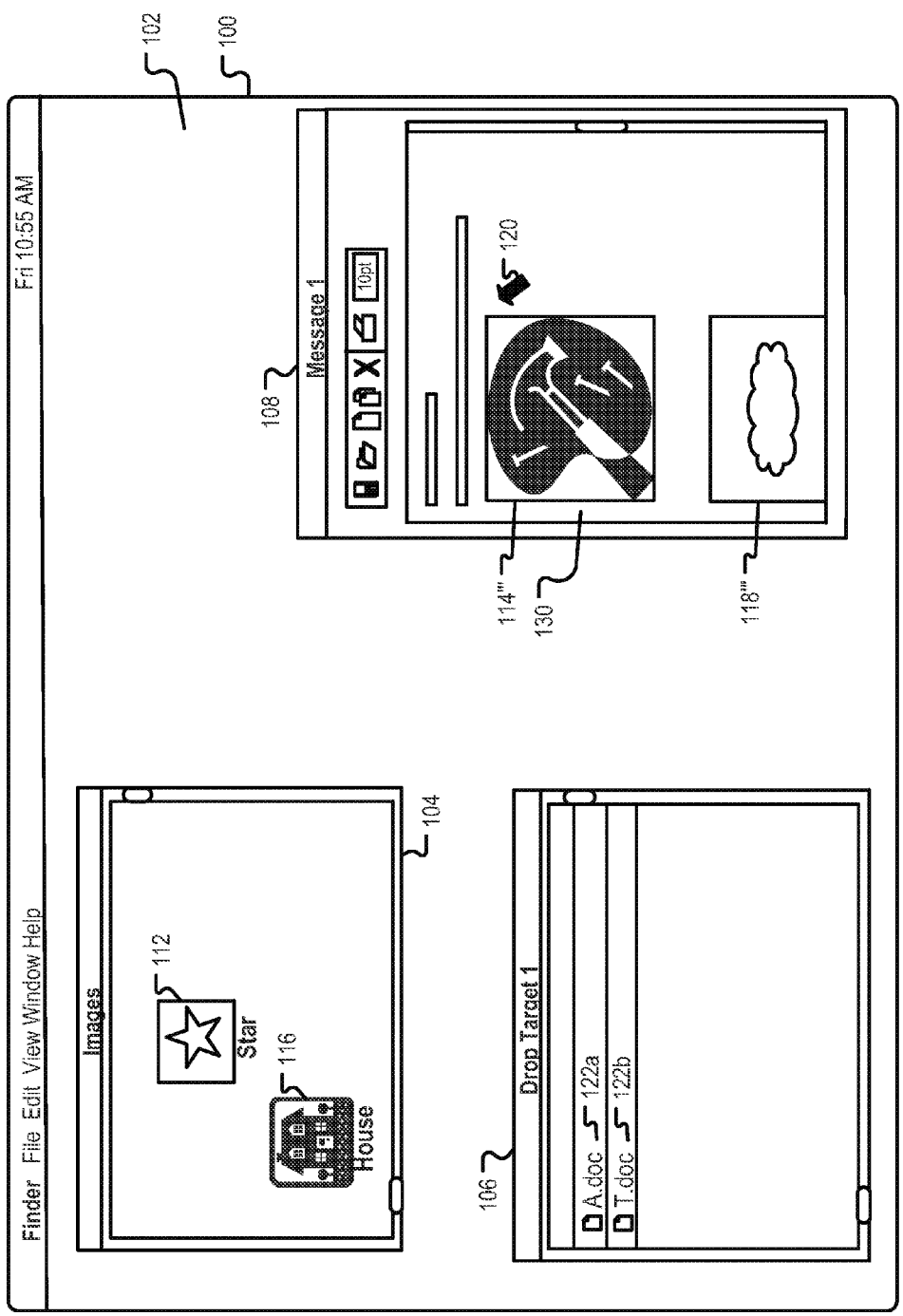
FIG. 1M illustrates exemplary user interface changes showing the representations of the selected items settling into their respective anticipated locations when the items are dropped into the second potential target container.

If the user decides to drop the selected items after seeing the preview of the items' representations at their anticipated locations in the application window 108, the user can release the items (e.g, by releasing the hold button on the mouse or keyboard, or by lifting the finger or stylus from the touch-sensitive display). FIG. 1M illustrates exemplary user interface changes showing that the representations of the selected items have settled into their respective anticipated locations when the items are dropped into the second potential target container (e.g., the application window 108).

As shown in FIG. 1M, the item representations 114''' and 118''' have changed from the semi-transparent states to an opaque state. Although the item representation 110''' is not currently visible in the revealed display area of the application window 108, if the user scrolls down further in the application window 108, the item representation 110''' will be revealed. After the drop operation is completed, the items representations 110, 114, and 118 can be removed from their original container (e.g., the folder window 104).

Figure 1N:
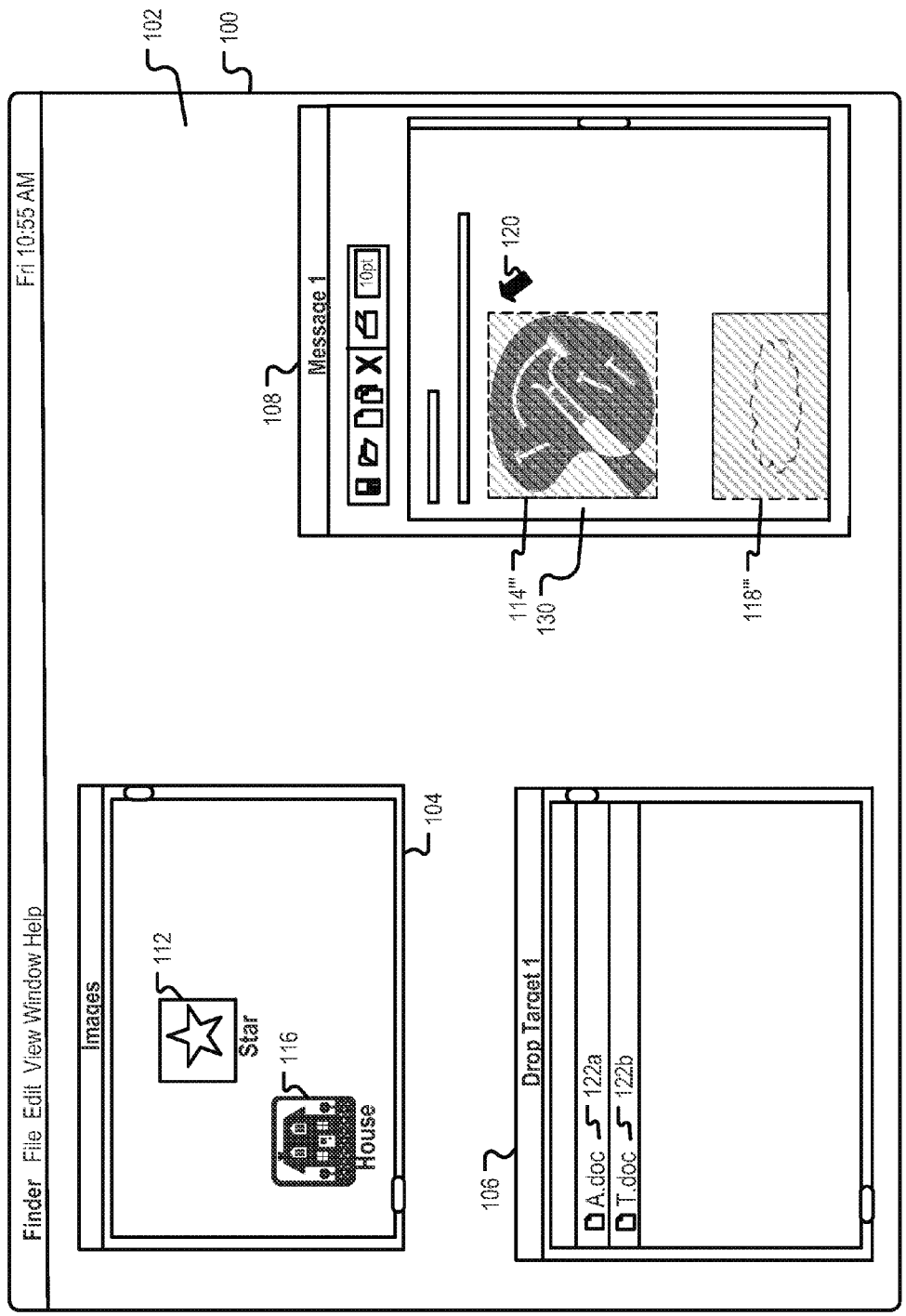
Figure 10:
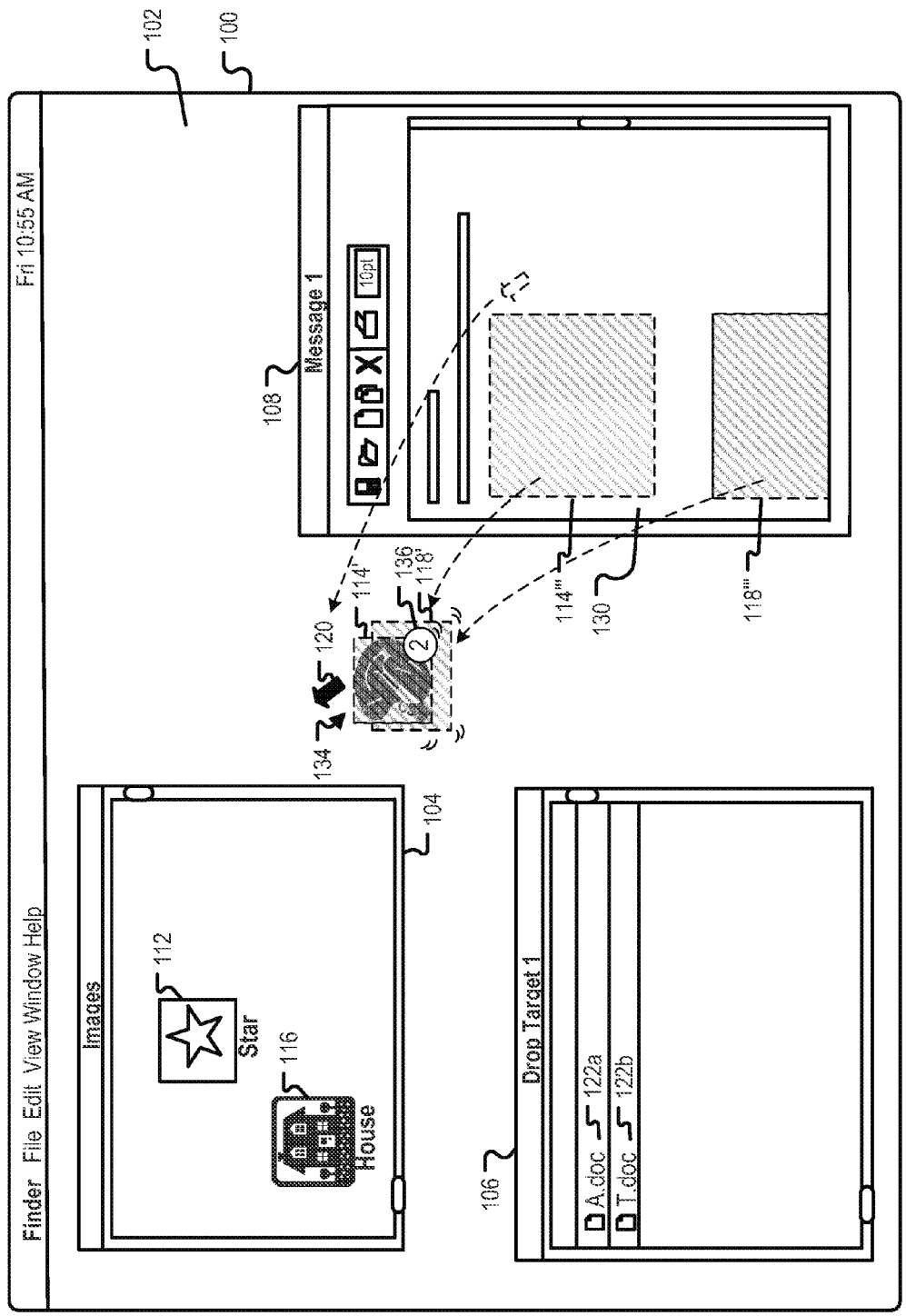

FIGS. 1A-1M illustrate the user interface changes in cases where items are dragged over or dropped into container objects that are in a keep-arranged state. FIGS. 1N-1P illustrate exemplary user interface changes showing selection and dragging of items from a first container object to a second container object that is in a free-arranged state.

Continue with the example above following the state as shown in FIG. 1M, suppose the user now selects two of the three items (e.g., the item representations 114''' and 118''') that were dropped into the application window 108, and starts to drag the selected items away from the application window 108 (as shown in FIG. 1N).

As the initiation of the dragging operation by the pointer is detected by the operating system, the operating system can present an animation showing the selected item representations (e.g., the item representations 114''' and 118''') moving from their original locations in the application window 108 toward the current location of the pointer as indicated by the cursor 120. In some implementations, the movement of the item representations can be slow and uniform when the pointer has not moved out of the application window 108, and can accelerate toward the current location of the pointer as soon as the pointer has exited the application window 108.

FIG. 1O illustrates that the selected item representations (or copies of the selected item representations) have moved out of the application windows 108 and formed a cluster 134 in proximity to the current location of the pointer (as indicated by the location of the cursor 120). In addition, the appearance of the item representations in the cluster 134 have changed from the picture view representations 114''' and 118''' to the items' large icon representations 114' and 118'. A count indicator 136 (e.g., a badge) can be displayed in proximity to the cluster 134 showing the number of item representations that are included in the cluster 134. Since only two items are selected, the number shown in the count indicator is "2."

FIG. 1P shows that the user has dragged the cluster 134 back into the folder window 104. The folder window 104 is associated with a large icon view in a free-arranged state. Since the desktop is also associated with the large icon view, and the item representations in the cluster 134 have already been updated to their respective large icon appearances when the cluster is dragged into the desktop area 102, the appearances of the item representations in the cluster 134 do not need to be updated when the cluster 134 is dragged into the folder window 104 from the desktop area 102.

Figure 1R:
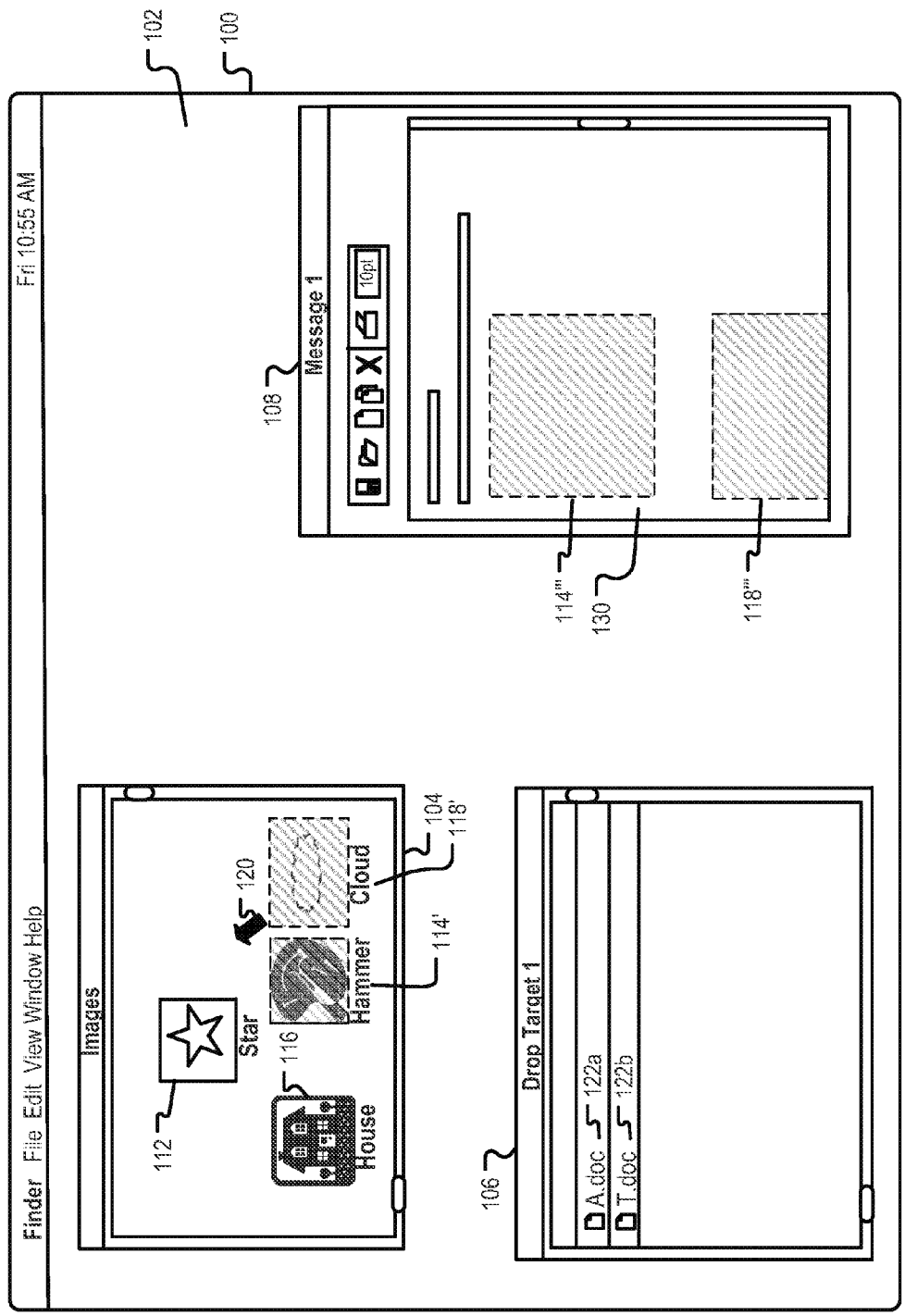

FIGS. 1Q-1R illustrate exemplary user interface changes showing a preview of the item representations being displayed at their anticipated locations in the free-arranged container and being moved by the pointer in the free-arranged container during the preview.

When the user has enter a command to see a preview of the item representations in their anticipated locations in the free-arranged container, an animation can be presented to illustrate the item representations 114' and 118' departing from the cluster 134 and moving toward their anticipated locations in the folder window 104. Since the folder window 104 is in a free-arranged state, the item representations 114' and 118' will simply be dropped at their current locations with some fixed spacing between them. As shown in FIG. 1Q, the item representations can overlap with existing items in the folder window 104 if dropped into the folder window 104 at their current locations.

FIG. 1R illustrates that before the user releases the selected items into the folder window 104, the user can adjust the current locations of the item representations 114' and 118' by moving the item representations in their expanded configuration in the preview state. For example, as shown in FIG. 1R, the item representations can be moved as a whole while they are in the expanded state until a suitable location is found (e.g., when the item representations 114' and 118' no longer overlap with the existing item representations 112 and 116 in the folder window 104).

Figure 1S:
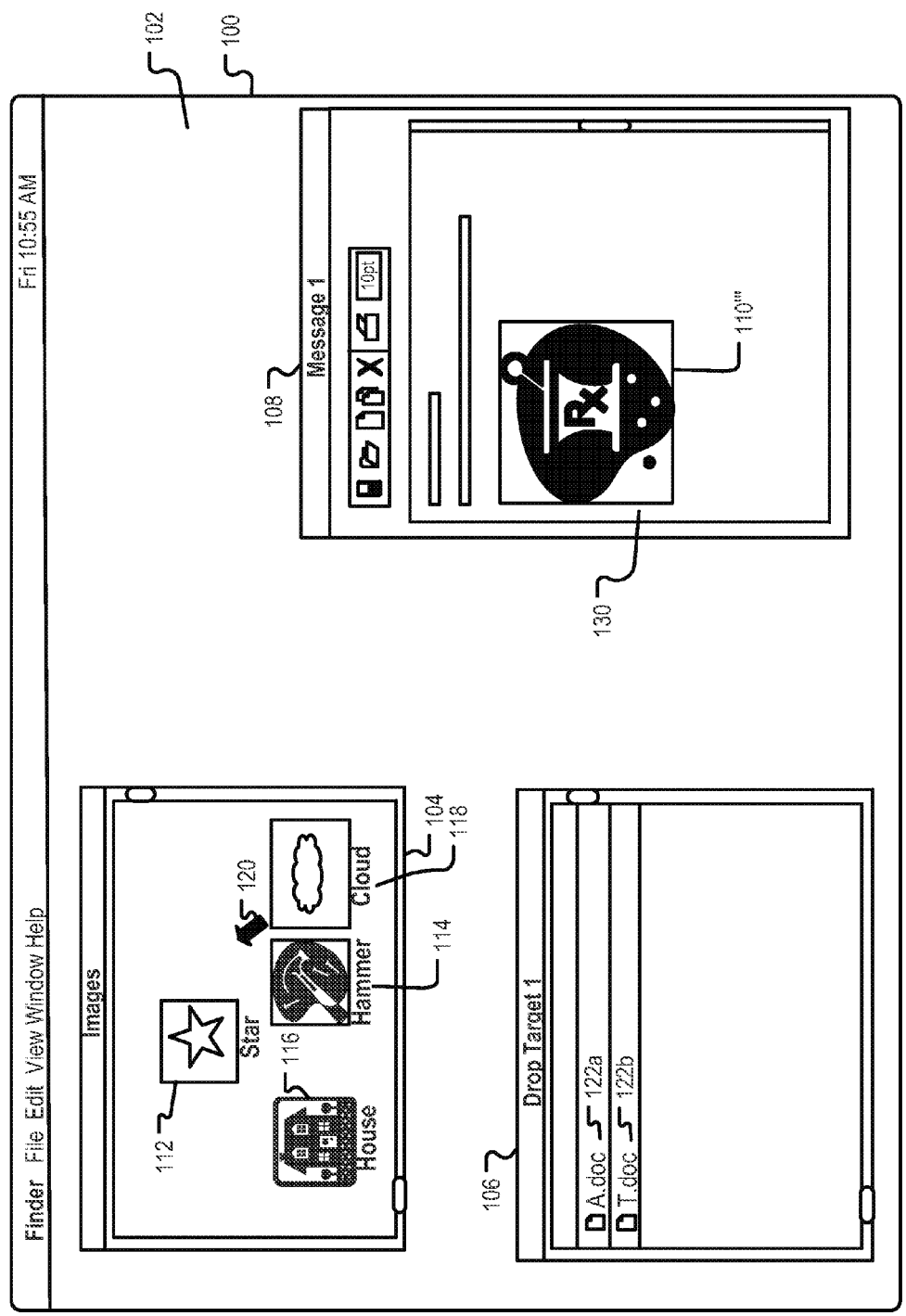
FIG. 1S illustrates exemplary user interface changes showing the selected items settling into their respective locations as shown in the preview after the items are released into the second container.

After the user releases the selected items in the folder window 104, the items can be shown to settle into their respective locations as previously shown in the preview. As shown in FIG. 1S, the item representations 114' and 118' have changed from the semi-transparent state to an opaque state and settled at their final locations shown in the preview, and the items are now represented by item representations 114 and 118 in FIG. 1S. The items can be shown to be removed from the application window 108, and the item representation 110''' can move up in the screen and be displayed in the application window 108.

In some implementations, as illustrated in FIGS. 1A-1S, the cluster of item representations is displayed in proximity to the current location of the pointer, but do not overlap with the current location of the pointer. A gap or distance is kept between the current location of the pointing device and the item representations when the pointer is being moved in the user interface as well as when the pointer is hovered over an area on the user interface. By keeping the distance or gap between the item representations and the pointer, the item representations can be kept clear of the area that is directly under and/or immediately around the current location of the pointer, thus the user can have a better view of the area before deciding to move or drop items to that location.

The above examples are merely illustrative. Although a particular sequence of events are shown, as can be easily understood by a person skilled in the art, that selection of items, the viewing configurations of the container windows, and the movement of the pointer from location to location can have many variations.

In some implementations, as illustrated in the above examples, each source container object (e.g., folder window 104 in FIG. 1A and application window 108 in FIG. 1M) can define one or more appearance styles for item representations that are displayed inside the source container. The different appearance styles can be triggered and applied to the item representations upon the occurrence of different trigger events. Example trigger events can be the hovering of the item representations over defined locations in the container object, the movement of the item representation according to a defined movement pattern or in a defined direction, a user input changing the current appearance style associated with the container object, and so on.

In some implementations, each source container can also define one or more appearance styles for item representations when the item representations are moved out of the source container object and onto an area of an ineligible drop target container. The source container can define different appearance styles for the item representations when the item representations are over different ineligible drop target containers.

In some implementations, each potential drop target container can also define one or more appearance styles when item representations are moved into the drop zone of the potential drop target container. Each of the appearance styles can also have different trigger events and when the trigger event of a particular appearance style is detected, the appearance style associated with that trigger event can be applied to the item representations that have entered the drop zone of the potential drop target container. In the above examples, the list view appearances of the item representations in the cluster 124 shown in FIG. 1F and the large icon appearances of the item representations in the cluster 134 shown in FIG. 1O are examples of the appearance styles applied to the item representations.

In some implementations, each appearance style can specify one or more layers for an item representation. Each layer can correspond to a component (e.g., an icon image, a text label, etc.) of the item representation. Each layer can have one or more associated properties that control the location, size, color, and other appearance properties of the layer. Each layer can also be associated with properties that control the animation style of the component when the item representation is changed from one appearance to another appearance. The properties associated with different layers of an item representation can be different from one another.

In some implementations, the appearance styles provided by different container objects can have different number of layers. Each layer can also be associated with properties that specify how the layer can be introduced or removed from the item representation when the item representation is changing its appearances according to the different appearance styles. For example, the text label layer can have an associated property that specifies the animation style (e.g., pop-up, fade-in, slide-in from the left, etc.) of how the text label can be added to the item representation. For another example, the text label layer can have another associated property that specifies the animation style (e.g., fade-out, shimmer-out, slide-out to the right, etc.) of how the text label can be removed from the item representation.

Each source container object can also define one or more formation styles for the item representations that are currently presented in the container object, and/or in proximity to the pointer over an ineligible drop target. Examples of the formation can be a free-arranged layout of the item representations in a container, a clustered configuration of the item representations displayed in proximity to the current location of the pointer, a keep-arranged layout in a list, a keep-arranged layout in one or more columns, and so on. Similarly, each potential drop target container can also define one or more formation styles for the item representations when the item representations have entered the drop zone of the potential drop target container. For example, the preview formation that shows the item representations in proximity to their respective expected locations in the potential drop target container can be implemented according to the formation style specified by the potential drop target container.

As described herein, the appearance styles and formation styles associated with each container object can be specified according to an API by the container object. The different appearances of the item representations and the different formations of a collection of item representations can be generated by the operating system according to the different appearance styles and formation styles of the relevant source container object and/or potential drop target container(s). The operating system can determine which appearance style and/or formation style to apply to the item representations based on which trigger events associated with the different appearance styles and formation styles are currently present or detected by the operating system. Animations showing the transitions from one appearance to another appearance and from one formation to another formation can be presented by the operating system according to the properties associated with the appearance styles and formation styles.

Exemplary Processes for Dragging and Dropping Items in a User Interface

Figure 2A:
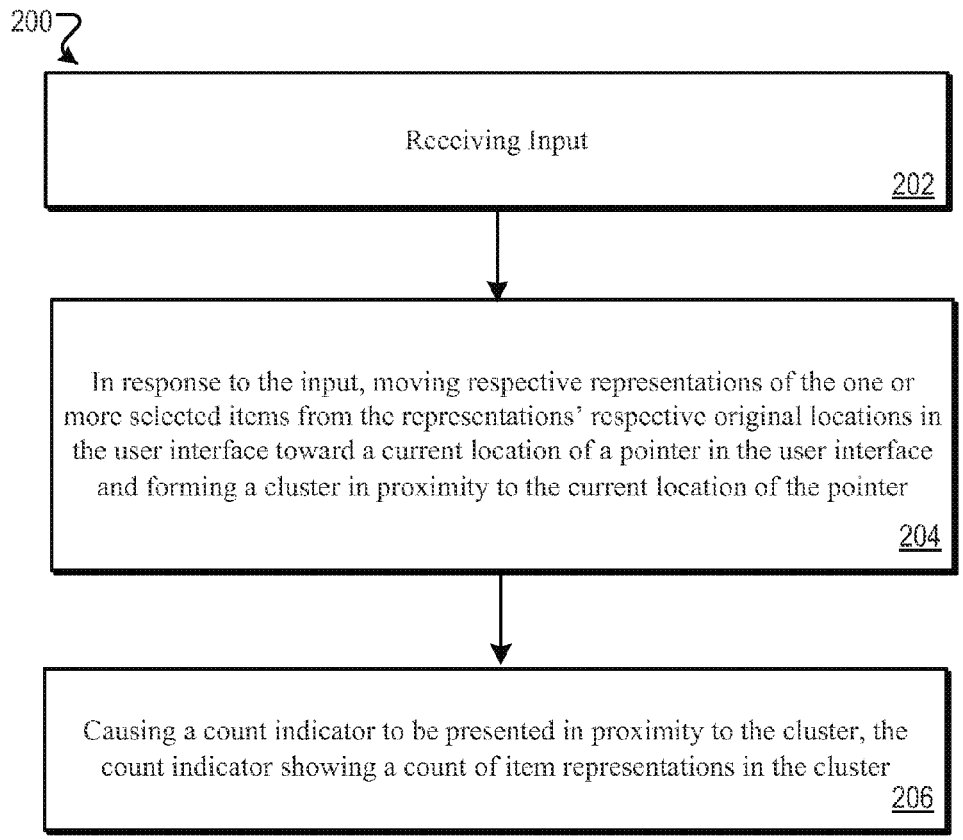
FIG. 2A is a flow diagram of an exemplary process for causing representations of selected items to form a cluster in proximity to the current location of a pointer in response to the initiation of a defined operation (e.g., a drag operation) on the selected items.

FIG. 2A is a flow diagram of an exemplary process 200 for causing representations of selected items to form a cluster in proximity to the current location of a pointer in response to the initiation of an operation (e.g., drag operation) on the selected items.

In the exemplary process 200, an input is received (202). The input can be a movement of a pointer initiating an operation (e.g., a dragging operating) on one or more selected items in a user interface. In response to the input, the operating system can cause an animation to be presented. In the animation, respective representations of the one or more selected items can be moved from the items' respective original locations in the user interface toward a current location of a pointer in the user interface and forming a cluster in proximity to the current location of the pointer (204).

In some implementations, the cluster includes the representations of the one or more selected items arranged in a stack. In some implementations, the cluster is expandable to show individual representations of the selected items in response to a defined input command. In some implementations, motions of the items' representations in the user interface are asynchronous.

In some implementations, in the exemplary process 200, the operating system can cause a count indicator to be presented in proximity to the cluster, the count indicator showing a count of item representations in the cluster.

In some implementations, the pointer in the user interface is a finger or stylus on a touch-sensitive display. In some implementations, the pointer in the user interface is a cursor of a mouse, a track-ball, a finger or stylus on a touch-sensitive surface. In some implementations, respective locations of the items' representations are independently variable within a defined range in the cluster.

Figure 2B:
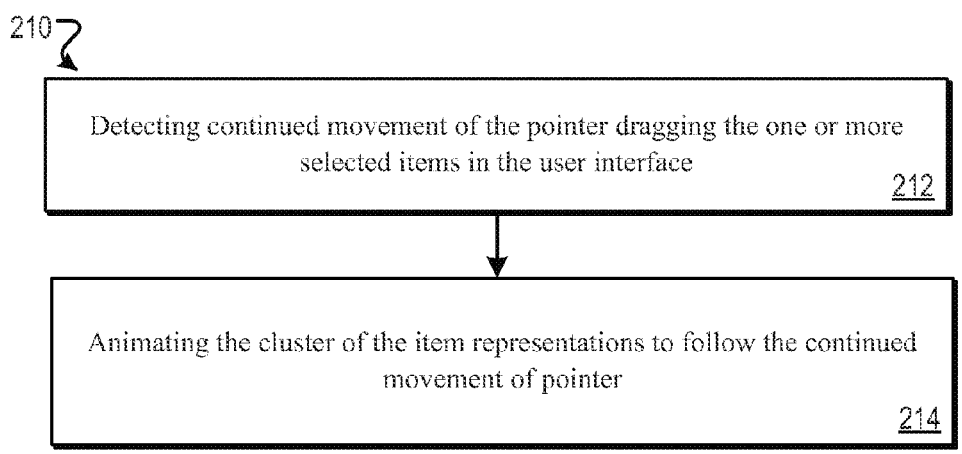
FIG. 2B is a flow diagram of an exemplary process for causing representations of the selected items to follow the continued movement of the pointer in the cluster.

FIG. 2B is a flow diagram of an exemplary process 210 for causing representations of the selected items to follow the continued movement of the pointer in the cluster. In the exemplary process 210, continued movement of the pointer dragging the one or more selected items in the user interface can be detected (212). In response to the continued movement, the operating system can animate the cluster of the items' representations to follow the continued movement of pointer (214).

In some implementations, each item representation in the cluster can move along a path that is independent of respective paths of other item representations in the cluster while following the continued movement of the pointer. In some implementations, each item representation in the cluster can move at a different speed than other item representations in the cluster while following the continued movement of the pointer.

FIG. 3 is a flow diagram of an exemplary process 300 for changing the appearances of the item representations when the cluster of item representations are moved to a container associated with a different appearance style.

In some implementations, the one or more items were selected from a first container in the user interface and each item's representation has a respective first appearance associated with the first container. In the process 300, the current location of the pointer can be detected within a drop zone of a second container in the user interface (302). While the current location of the pointer remains within the drop zone of the second container, the operating system can cause the representations of the selected items to adopt respective second appearances, where the respective second appearances resemble respective anticipated appearances of the items' representations if the items were to be dropped into the second container (304).

In some implementations, each of the first container and the second container is one of a desktop or a window on the desktop, each of the first container and the second container is associated with a large icon view, a small icon view, a list view, a column view, or a picture view, respectively, and each of the views is in either a free-arranged state or a keep-arranged state.

In some implementations, at least one of the first container and the second container is an application window and the application window is operable to present the selected items in an application-defined view. In some implementations, the application-defined view of the selected items are defined through an application programming interface (API) associated with the user interface.

FIG. 4A is a flow diagram of an exemplary process 400 for showing a preview of the item representations at their respective anticipated locations in a potential target container.

In the exemplary process 400, an input requesting a preview of the items' representations being dropped in the second container can be detected (402). In response to detecting the input, the operating system can animate the representations of the selected items to depart from the cluster and move toward their respective anticipated locations in the second container, where the respective anticipated locations are locations the representations would have if the items were to be dropped in the second container (404). In some implementations, the input requesting the preview is an extended hovering of the pointer over the drop zone of the second container.

In some implementations, the representations of the selected items are displayed at or in proximity to the items' respective anticipated locations as respective semi-transparent overlays.

In some implementations, the anticipated location of at least one of the selected items is in an area of the second container that is not currently visible in the user interface, and the representation of the at least one item departs from the cluster and moves into the invisible area of the second container along a respective path in the user interface.

FIG. 4B is a flow diagram of an exemplary process 410 for dropping the selected items in the potential target container.

In the exemplary process 410, an input releasing the one or more selected items into the drop zone of the second container can be detected (412). In response to the releasing input, the operating system can cause the one or more selected items to be inserted at the respective anticipated locations of the selected items in the second container (414).

In some implementations, for item representations having their respective anticipated locations within a visible area of the second container, the item representations can change from a semi-transparent state to an opaque state upon completion of the items' insertion into the item's respective anticipated locations.

Figure 5:
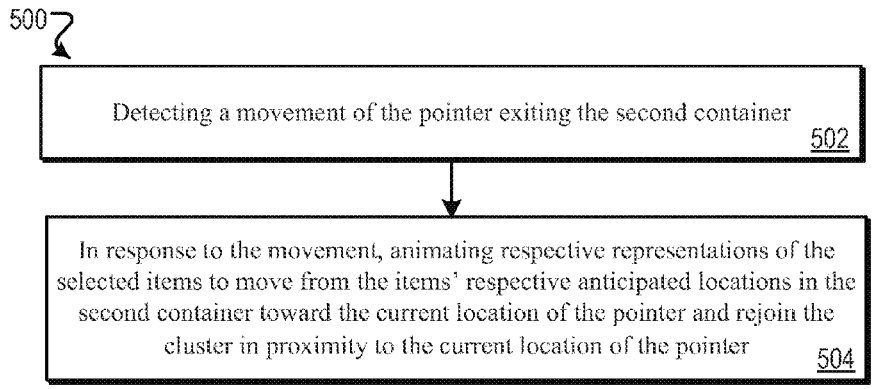
FIG. 5 is a flow diagram of an exemplary process for moving away from the potential target container after the preview without dropping the selected items into the potential target container.

FIG. 5 is a flow diagram of an exemplary process 500 for moving away from the potential target container after the preview without dropping the selected items into the potential target container.

In the exemplary process 500, a movement of the pointer exiting the second container can be detected (502). In response to the movement exiting the second container, the operating system can animate respective representations of the one or more selected items to move from the items' respective anticipated locations in the second container toward the current location of the pointer and to rejoin the cluster in proximity to the current location of the pointer (504).

Figure 6:
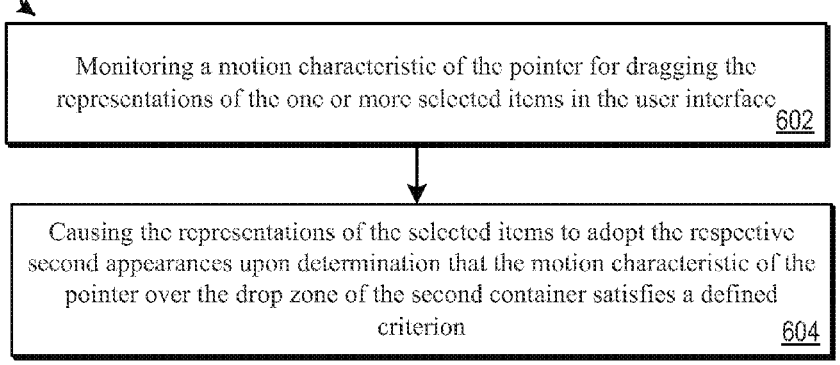
FIG. 6 is a flow diagram of an exemplary process for determining whether to present the preview of the item representations in their anticipated locations in the potential target container.

FIG. 6 is a flow diagram of an exemplary process 600 for determining whether to present the preview of the item representations in their anticipated locations in the potential target container.

In the exemplary process 600, the operating system can monitor a motion characteristic of the pointer for dragging the representations of the one or more selected items in the user interface (602). The operating system can cause the representations of the selected items to adopt the respective second appearances upon determination that the motion characteristic of the pointer over the drop zone of the second container satisfies a defined criterion (604). In some implementations, the motion characteristic of the pointer is one or more of a speed and an acceleration of the pointer, and the defined criterion specifies characteristic values of the speed or the acceleration that would cause the items' representations to adopt their respective second appearances. In some implementations, the characteristic values of the speed or the acceleration are user-specified values.

Figure 7:
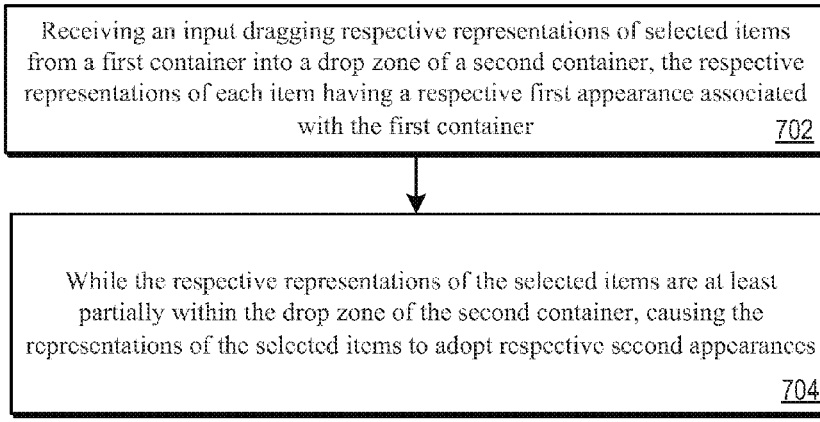
FIG. 7 is a flow diagram of an exemplary process for changing the appearances of item representations when the items are being dragged from one container to another container.

FIG. 7 is a flow diagram of an exemplary process 700 for changing the appearances of item representations when the items are being dragged from one container to another container.

In the exemplary process 700, an input dragging respective representations of one or more selected items from a first container into a drop zone of a second container can be received, where the respective representation of each item has a respective first appearance associated with the first container (702). While the respective representations of the one or more selected items are at least partially within the drop zone of the second container, the operating system can cause the representations of the selected items to adopt respective second appearances, where the respective second appearances imitate anticipated appearances of the items' representations if the items were to be dropped into the second container (704).

In some implementations, the respective first appearance of each item is defined through an application programming interface (API) by the first container and the respective second appearance of each item is defined through the API by the second container.

In some implementations, the representation of each item includes two or more layers for at least one of the item's first and second appearances, and the respective representations of the one or more selected items can be animated to illustrate a respective transition from the items' first appearances to the items' second appearances, where a respective animation is performed on each of the two or more layers to illustrate the transition.

In some implementations, each of the two or more layers is associated with a respective animation style for the respective animation performed on the layer.

In some implementations, while the respective representations of the one or more selected items are at least partially within an area of an ineligible drop target, the representations of the selected items can be caused to adopt respective third appearances associated with the first container. In some implementations, the respective third appearances are defined through an application programming interface (API) by the first container.

In some implementations, the respective representations of the selected items are in a first formation when shown in their respective first appearances, and the respective representations of the selected items are in a second formation when shown in their respective second appearances, where the first formation is defined by the first container and the second formation is defined by the second container through an application programming interface (API).

The above processes are merely examples. Various combinations of the above processes are possible.

Exemplary Software Architecture

Figure 8A:
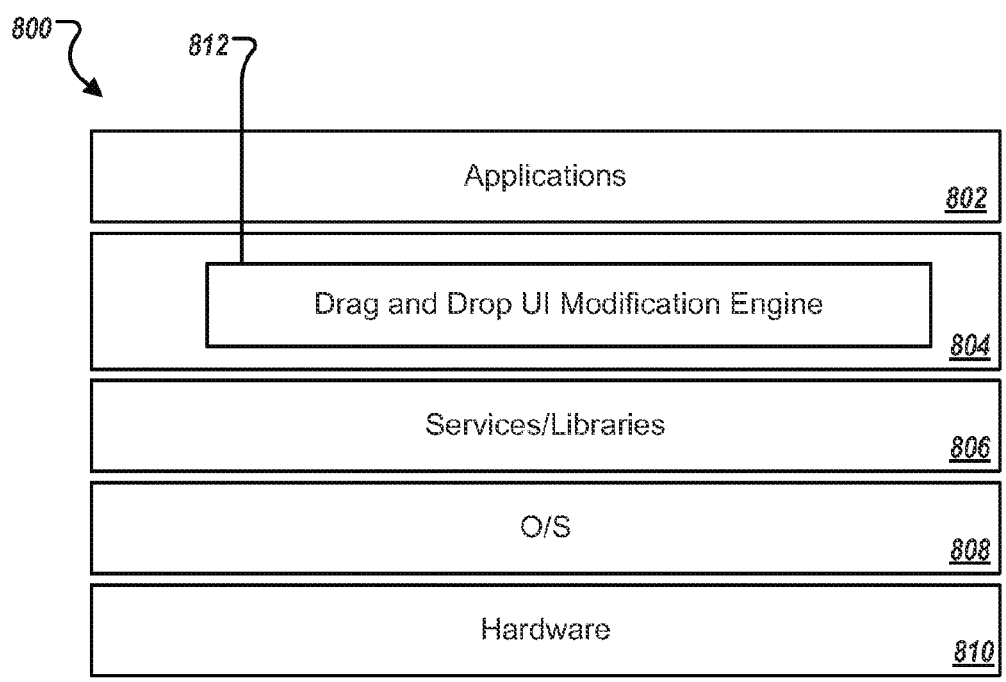
FIGS. 8A-8C illustrate exemplary software architecture for implementing the menu presentation processes described in reference to FIGS. 1A-1S.

FIG. 8A is an exemplary software architecture for implementing the processes and user interfaces described in reference to FIGS. 1-7. In some implementations, the program modules implementing the processes can be part of a framework in a software architecture or stack. An exemplary software stack 800 can include an applications layer 802, framework layer 804, services layer 806, OS layer 808 and hardware layer 810. Applications (e.g., email, word processing, text messaging, etc.) can incorporate function hooks to an accessibility API. Framework layer 804 can include drag and drop UI modification engine 812. The drag and drop UI modification engine 812 can make API calls to graphics services or libraries in services layer 806 or OS layer 808 to perform all or some of its tasks described in reference to FIGS. 1-7. The drag and drop UI modification engine 812 can also make API calls to the application layer 802 to obtain the information necessary to define the display object, and determine the location and the content area of the display object according to the descriptions disclosed in this specification.

The drag and drop UI modification engine 812 can also make API calls to services or libraries (e.g., text services) in services layer 806 or OS layer 808 to perform all or some of its tasks.

Services layer 806 can provide various graphics, animations and UI services to support the graphical functions of the drag and drop UI modification engine 812 and applications (e.g., the email editor application) in applications layer 802. In some implementations, services layer 806 can also include a touch model for interpreting and mapping raw touch data from a touch sensitive device to touch events (e.g., gestures, rotations), which can be accessed by applications using call conventions defined in a touch model API. Services layer 806 can also include communications software stacks for wireless communications.

OS layer 808 can be a complete operating system (e.g., MAC OS) or a kernel (e.g., UNIX kernel). Hardware layer 810 includes hardware necessary to perform the tasks described in reference to FIGS. 1-7, including but not limited to: processors or processing cores (including application and communication baseband processors), dedicated signal/image processors, ASICs, graphics processors (e.g., GNUs), memory and storage devices, communication ports and devices, peripherals, etc.

One or more Application Programming Interfaces (APIs) may be used in some implementations. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some implementations, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other implementations, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some implementations, an API may allow a client program to use the services provided by a Software Development Kit (SDK) library. In other implementations, an application or other client program may use an API provided by an Application Framework. In these implementations, the application or client program may incorporate calls to functions or methods provided by the SDK and provided by the API, or use data types or objects defined in the SDK and provided by the API. An Application Framework may, in these implementations, provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 8B:
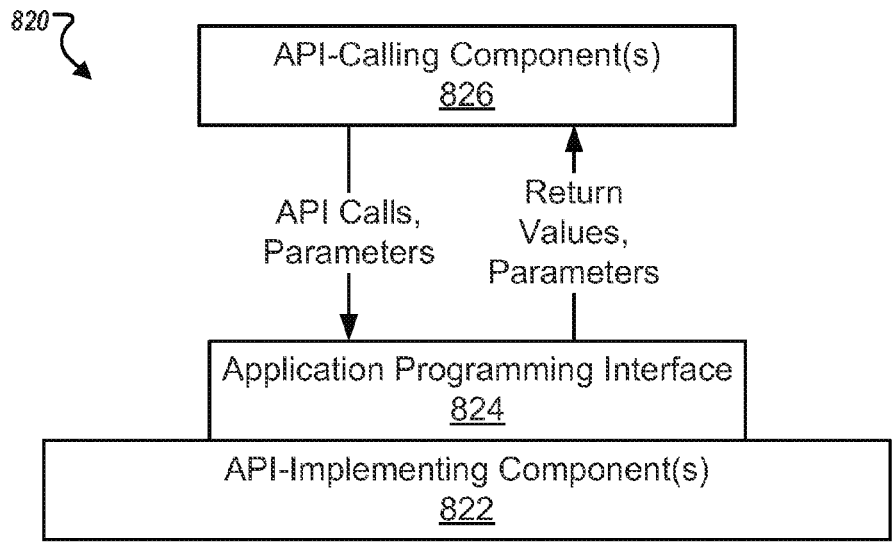

FIG. 8B is a block diagram illustrating an exemplary API architecture, which may be used in the implementation of some the processes and user interface changes disclosed herein. As shown in FIG. 8B, the API architecture 820 includes the API-implementing component 822 (e.g., an operating system, a library, a device driver, an API, an application program, software or other module) that implements the API 824. The API 824 specifies one or more functions, methods, classes, objects, protocols, data structures, formats and/or other features of the API-implementing component that may be used by the API-calling component 826. The API 824 can specify at least one calling convention that specifies how a function in the API-implementing component receives parameters from the API-calling component and how the function returns a result to the API-calling component. The API-calling component 826 (e.g., an operating system, a library, a device driver, an API, an application program, software or other module), makes API calls through the API 824 to access and use the features of the API-implementing component 822 that are specified by the API 824. The API-implementing component 822 may return a value through the API 824 to the API-calling component 826 in response to an API call.

It will be appreciated that the API-implementing component 822 may include additional functions, methods, classes, data structures, and/or other features that are not specified through the API 824 and are not available to the API-calling component 826. It should be understood that the API-calling component 826 may be on the same system as the API-implementing component 822 or may be located remotely and accesses the API-implementing component 822 using the API 824 over a network. While FIG. 8B illustrates a single API-calling component 830 interacting with the API 824, it should be understood that other API-calling components, which may be written in different languages (or the same language) than the API-calling component 826, may use the API 824.

The API-implementing component 822, the API 824, and the API-calling component 826 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 8C:
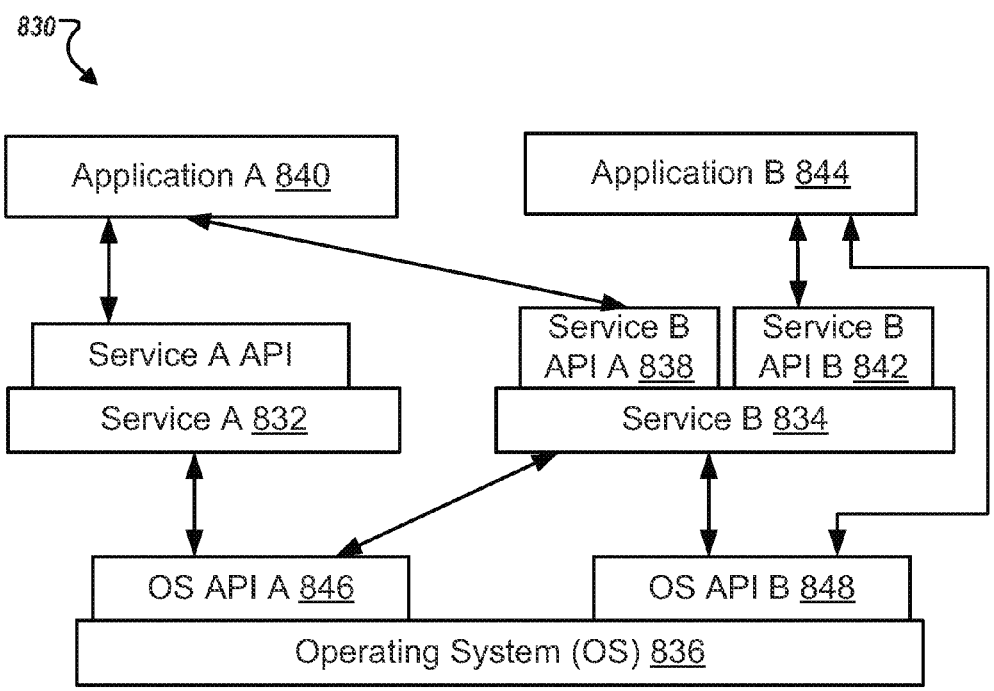

In FIG. 8C ("Software Stack" 830), an exemplary implementation, applications can make calls to Service A 832 or Service B 834 using several Service APIs (Service API A and Service API B) and to Operating System (OS) 836 using several OS APIs. Service A 832 and service B 834 can make calls to OS 836 using several OS APIs.

Note that the Service B 834 has two APIs, one of which (Service B API A 838) receives calls from and returns values to Application A 840 and the other (Service B API B 842) receives calls from and returns values to Application B 844. Service A 832 (which can be, for example, a software library) makes calls to and receives returned values from OS API A 846, and Service B 834 (which can be, for example, a software library) makes calls to and receives returned values from both OS API A 846 and OS API B 848. Application B 844 makes calls to and receives returned values from OS API B 848.

Exemplary Mobile Device Architecture

Figure 9:
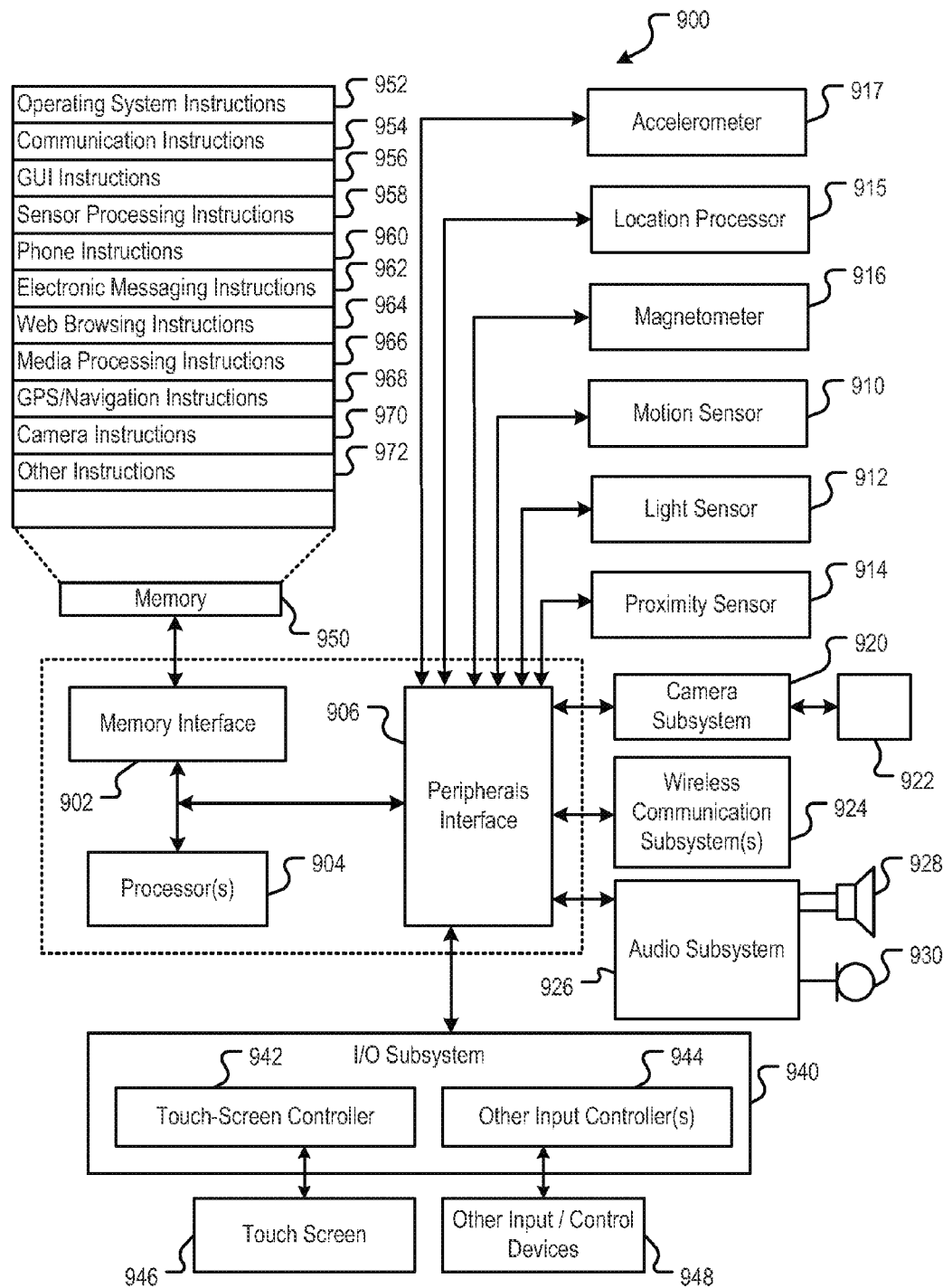
FIG. 9 is a block diagram of exemplary hardware architecture for implementing the user interfaces and processes described in reference to FIGS. 1-8C.

FIG. 9 is a block diagram of exemplary hardware architecture for a device implementing the drag and drop UI modification processes and interfaces described in reference to FIGS. 1-8. The device can include memory interface 902, one or more data processors, image processors and/or processors 904, and peripherals interface 906. Memory interface 902, one or more processors 904 and/or peripherals interface 906 can be separate components or can be integrated in one or more integrated circuits. The various components in the device, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to the device on or off. The user may be able to customize a functionality of one or more of the buttons. The touch screen 946 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; and camera instructions 970 to facilitate camera-related processes and functions. The memory 950 may also store other software instructions (not shown), such as security instructions, web video instructions to facilitate web video-related processes and functions, and/or web-shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can also include other instructions 972.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard, a mouse or a trackball, or a pointing device (e.g., a finger or stylus on a touch-sensitive surface or touch-sensitive display) by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps as disclosed herein can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A method, comprising:
at a computing device with a display and one or more input devices:
displaying, on the display, representations of two or more selected items in a container in a user interface, the representations of the two or more selected items having a spatial relationship within the container;
while displaying, on the display, the representations of the two or more selected items, receiving a first input, via the one or more input devices, that corresponds to movement of a pointer within the container;
in response to the first input, moving, on the display, the representations of the two or more selected items in the user interface in accordance with the movement of the pointer in the user interface, while maintaining the spatial relationship between the representations of the two or more selected items;

after moving the representations of the two or more selected items while maintaining the spatial relationship between the representations of the two or more selected items, receiving a second input, via the one or more input devices, to move the pointer outside of the container; and in response to receiving the second input to move the pointer outside of the container, moving, on the display, the pointer outside of the container, and when the pointer has moved outside of the container, varying the spatial relationship between the representations of the two or more selected items to form a cluster of the representations in proximity to the pointer.

2. The method of claim 1, further comprising:
arranging the representations in the cluster in a stack.

3. The method of claim 1, further comprising:
after forming the cluster, expanding the cluster to show individual representations of the two or more selected items in response to a defined input command.

4. The method of claim 1, wherein motions of the representations of the two or more selected items when forming the cluster in the user interface are asynchronous.

5. The method of claim 1, further comprising:
after forming the cluster, causing a count indicator to be presented in proximity to the cluster, the count indicator showing a count of item representations in the cluster.

6. The method of claim 1, wherein the pointer is a finger or stylus on a touch-sensitive display.

7. The method of claim 1, wherein after forming the cluster, respective locations of the representations of the two or more selected items are independently variable within a defined range in the cluster.

8. The method of claim 1, wherein after forming the cluster, each item representation in the cluster moves along a path that is independent of respective paths of other item representations in the cluster while following a continued movement of the pointer.

9. The method of claim 1, wherein after forming the cluster, each item representation in the cluster moves at a speed that is different than respective speeds of other item representations in the cluster while following a continued movement of the pointer.

10. The method of claim 1, further comprising:
selecting the two or more items from a first container in the user interface, wherein the representations of the two or more selected items have respective first appearances associated with the first container;
detecting a current location of the pointer within a drop zone of a second container in the user interface; and
while the current location of the pointer remains within the drop zone of the second container, causing the representations of the two or more selected items to adopt respective second appearances associated with the second container.

11. The method of claim 10, wherein each of the first container and the second container is one of a desktop or a window on the desktop, each of the first container and the second container is associated with one of a large icon view, a small icon view, a list view, a column view, or a picture view, respectively, and each of the views is in either a free-arranged state or a keep-arranged state.

12. The method of claim 10, wherein at least one of the first container and the second container is an application window and the application window is operable to present the representations of the two or more selected items in an application-defined view.

13. The method of claim 10, wherein an application-defined view of the two or more selected items is defined through an application programming interface (API) associated with the user interface.

14. The method of claim 10, further comprising:
detecting an input requesting a preview of the representations of the two or more selected items being dropped in the second container; and
in response to detecting the input, animating the representations of the two or more selected items to depart from the cluster and move toward their respective anticipated locations in the second container.

15. The method of claim 14, wherein the input requesting the preview is a detected hovering of the pointer over the drop zone of the second container.

16. The method of claim 14, wherein the representations of the two or more selected items are displayed at or in proximity to the items' respective anticipated locations as respective semi-transparent overlays.

17. The method of claim 14, wherein the anticipated location of at least one of the two or more selected items is in an area of the second container that is not currently visible in the user interface, and the representation of the at least one item departs from the cluster and moves into the invisible area of the second container along a respective path in the user interface.

18. The method of claim 14, further comprising:
detecting an input releasing the two or more selected items into the drop zone of the second container; and
in response to the releasing input, causing the two or more selected items to be inserted at the respective anticipated locations of the two or more selected items in the second container.

19. The method of claim 18, wherein, for item representations having their respective anticipated locations within a visible area of the second container, the item representations change from a semi-transparent state to an opaque state upon completion of the items' insertion into the item's respective anticipated locations.

20. The method of claim 14, further comprising:
detecting a movement of the pointer exiting the second container; and
in response to the movement exiting the second container, animating the respective representations of the two or more selected items to move from the items' respective anticipated locations in the second container toward the current location of the pointer and rejoin the cluster in proximity to the current location of the pointer.

21. The method of claim 10, further comprising:
monitoring a motion characteristic of the pointer for dragging the representations of the two or more selected items in the user interface; and
causing the representations of the two or more selected items to adopt the respective second appearances upon determination that the motion characteristic of the pointer over the drop zone of the second container satisfies a defined criterion.

22. The method of claim 21, wherein the motion characteristic of the pointer is at least one of a speed and an acceleration of the pointer in the user interface, and the defined criterion specifies characteristic values of the speed or the acceleration that would cause the representations of the two or more selected items to adopt their respective second appearances.

23. The method of claim 22, wherein the characteristic values of the speed or the acceleration are user-specified values.

24. A method, comprising:
at a computing device with a display that is configured to display a user interface, and one or more input devices configured to receive inputs:
receiving an input, via the one or more input devices, dragging respective representations of one or more selected items displayed on the display from a first container in the user interface into a drop zone of a second container in the user interface such that the dragging passes over the drop zone, the respective representations of the one or more selected items having respective first appearances associated with the first container; and
in response to the input:
in accordance with a determination that that the dragging meets appearance-modification criteria, wherein the appearance-modification criteria include a criterion that is met when the dragging has, while passing over the drop zone, slowed down below a threshold speed or stopped within the drop zone of the second container, modifying the respective representations of the one or more selected items to have respective second appearances associated with the second container, different than the respective first appearances; and
in accordance with a determination that the dragging does not meet the appearance-modification criteria while the respective representations of the one or more selected items are passing over the drop zone of the second container to another location in the user interface, maintaining the respective representations of the one or more selected items as having the respective first appearances associated with the first container.

25. The method of claim 24, wherein the respective first appearance of each item is defined through an application programming interface (API) by the first container and the respective second appearance of each item is defined through the API by the second container.

26. The method of claim 24, wherein the respective representation of each of the one or more selected items includes two or more layers for at least one of the item's first and second appearances, and the method further comprising:
animating the respective representation of at least one of the selected items to illustrate a respective transition from the item's first appearance to the item's second appearance, wherein a respective animation is performed on each of the two or more layers to illustrate the transition.

27. The method of claim 26, wherein each of the two or more layers is associated with a respective animation style for the respective animation performed on the layer.

28. The method of claim 24, further comprising:
while the respective representations of the one or more selected items are at least partially within an area of an ineligible drop target, causing the respective representations of the one or more selected items to adopt respective third appearances associated with the first container.

29. The method of claim 28, wherein the respective third appearances are defined through an application programming interface (API) by the first container.

30. The method of claim 24, wherein the respective representations of the one or more selected items are in a first formation when shown in their respective first appearances, and the respective representations of the one or more selected items are in a second formation when shown in their respective second appearances, and wherein the first formation is defined by the first container and the second formation is defined by the second container through an application programming interface (API).

31. A non-transitory computer-readable storage medium having instructions stored thereon, which, when executed by one or more processors, cause the one or more processors to perform operations comprising:
at a computing device with a display and one or more input devices:
displaying, on the display, representations of two or more selected items in a container in a user interface, the representations of the two or more selected items having a spatial relationship within the container;
while displaying, on the display, the representations of the two or more selected items, receiving a first input, via the one or more input devices, that corresponds to movement of a pointer within the container;
in response to the first input, moving, on the display, the representations of the two or more selected items in the user interface in accordance with the movement of the pointer in the user interface, while maintaining the spatial relationship between the representations of the two or more selected items;
after moving the representations of the two or more selected items while maintaining the spatial relationship between the representations of the two or more selected items, receiving a second input, via the one or more input devices, to move the pointer outside of the container; and in response to receiving the second input to move the pointer outside of the container, moving, on the display, the pointer outside of the container, and when the pointer has moved outside of the container, varying the spatial relationship between the representations of the two or more selected items to form a cluster of the representations in proximity to the pointer.

32. The non-transitory computer-readable storage medium of claim 31, wherein motions of the representations of the two or more selected items when forming the cluster in the user interface are asynchronous.

33. The non-transitory computer-readable storage medium of claim 31, wherein the operations further comprise:
after forming the cluster, causing a count indicator to be presented in proximity to the cluster, the count indicator showing a count of item representations in the cluster.

34. The non-transitory computer-readable storage medium of claim 31, wherein the pointer is a finger or stylus on a touch-sensitive display.

35. The non-transitory computer-readable storage medium of claim 31, wherein after forming the cluster, each item representation in the cluster moves along a path that is independent of respective paths of other item representations in the cluster while following a continued movement of the pointer.

36. The non-transitory computer-readable storage medium of claim 31, wherein after forming the cluster, each item representation in the cluster moves at a speed that is different than respective speeds of other item representations in the cluster while following a continued movement of the pointer.

37. The non-transitory computer-readable storage medium of claim 31, wherein the operations further comprise:
selecting the two or more items from a first container in the user interface, wherein the representations of the two or more selected items have respective first appearances associated with the first container;
detecting a current location of the pointer within a drop zone of a second container in the user interface; and while the current location of the pointer remains within the drop zone of the second container, causing the representations of the two or more selected items to adopt respective second appearances associated with the second container.

38. The non-transitory computer-readable storage medium of claim 37, wherein at least one of the first container and the second container is an application window and the application window is operable to present the representations of the two or more selected items in an application-defined view.

39. The non-transitory computer-readable storage medium of claim 37, wherein the operations further comprise:
detecting an input requesting a preview of the representations of the two or more selected items being dropped in the second container; and
in response to detecting the input, animating the representations of the two or more selected items to depart from the cluster and move toward their respective anticipated locations in the second container.

40. The non-transitory computer-readable storage medium of claim 39, wherein the input requesting the preview is a detected hovering of the pointer over the drop zone of the second container.

41. The non-transitory computer-readable storage medium of claim 39, wherein the operations further comprise:
detecting an input releasing the two or more selected items into the drop zone of the second container; and
in response to the releasing input, causing the two or more selected items to be inserted at the respective anticipated locations of the two or more selected items in the second container.

42. The non-transitory computer-readable storage medium of claim 39, wherein the operations further comprise:
detecting a movement of the pointer exiting the second container; and
in response to the movement exiting the second container, animating the respective representations of the two or more selected items to move from the items' respective anticipated locations in the second container toward the current location of the pointer and rejoin the cluster in proximity to the current location of the pointer.

43. The non-transitory computer-readable storage medium of claim 37, wherein the operations further comprise:
monitoring a motion characteristic of the pointer for dragging the representations of the two or more selected items in the user interface; and
causing the representations of the two or more selected items to adopt the respective second appearances upon determination that the motion characteristic of the pointer over the drop zone of the second container satisfies a defined criterion.

44. The non-transitory computer-readable storage medium of claim 43, wherein the motion characteristic of the pointer is at least one of a speed and an acceleration of the pointer in the user interface, and the defined criterion specifies characteristic values of the speed or the acceleration that would cause the representations of the two or more selected items to adopt their respective second appearances.

45. A system comprising:
a display;
one or more input devices;
one or more processors; and
memory having instructions stored thereon, which, when executed by the one or more processors, cause the one or more processors to perform operations comprising:
displaying, on the display, representations of two or more selected items in a container in a user interface, the representations of the two or more selected items having a spatial relationship within the container;
while displaying, on the display, the representations of the two or more selected items, receiving a first input, via the one or more input devices, that corresponds to movement of a pointer within the container;
in response to the first input, moving, on the display, the representations of the two or more selected items in the user interface in accordance with the movement of the pointer in the user interface, while maintaining the spatial relationship between the representations of the two or more selected items;
after moving the representations of the two or more selected items while maintaining the spatial relationship between the representations of the two or more selected items, receiving a second input, via the one or more input devices, to move the pointer outside of the container; and in response to receiving the second input to move the pointer outside of the container, moving, on the display, the pointer outside of the container, and when the pointer has moved outside of the container, varying the spatial relationship between the representations of the two or more selected items to form a cluster of the representations in proximity to the pointer.

46. The system of claim 45, wherein motions of the representations of the two or more selected items when forming the cluster in the user interface are asynchronous.

47. The system of claim 45, wherein the operations further comprise:
after forming the cluster, causing a count indicator to be presented in proximity to the cluster, the count indicator showing a count of item representations in the cluster.

48. The system of claim 45, wherein the pointer is a finger or stylus on a touch- sensitive display.

49. The system of claim 45, wherein after forming the cluster, each item representation in the cluster moves along a path that is independent of respective paths of other item representations in the cluster while following a continued movement of the pointer.

50. The system of claim 45, wherein after forming the cluster, each item representation in the cluster moves at a speed that is different than respective speeds of other item representations in the cluster while following a continued movement of the pointer.

51. The system of claim 45, wherein the operations further comprise:
selecting the two or more items from a first container in the user interface, wherein the representations of the two or more selected items have respective first appearances associated with the first container;
detecting a current location of the pointer within a drop zone of a second container in the user interface; and
while the current location of the pointer remains within the drop zone of the second container, causing the representations of the two or more selected items to adopt respective second appearances associated with the second container.

52. The system of claim 51, wherein at least one of the first container and the second container is an application window and the application window is operable to present the representations of the two or more selected items in an application-defined view.

53. The system of claim 51, wherein the operations further comprise:

detecting an input requesting a preview of the representations of the two or more selected items being dropped in the second container; and in response to detecting the input, animating the representations of the two or more selected items to depart from the cluster and move toward their respective anticipated locations in the second container.

54. The system of claim 53, wherein the input requesting the preview is a detected hovering of the pointer over the drop zone of the second container.

55. The system of claim 53, wherein the operations further comprise:

detecting an input releasing the two or more selected items into the drop zone of the second container; and in response to the releasing input, causing the two or more selected items to be inserted at the respective anticipated locations of the two or more selected items in the second container.

56. The system of claim 53, wherein the operations further comprise:

detecting a movement of the pointer exiting the second container; and in response to the movement exiting the second container, animating the respective representations of the two or more selected items to move from the items' respective anticipated locations in the second container toward the current location of the pointer and rejoin the cluster in proximity to the current location of the pointer.

57. The system of claim 51, wherein the operations further comprise:

monitoring a motion characteristic of the pointer for dragging the representations of the two or more selected items in the user interface; and causing the representations of the two or more selected items to adopt the respective second appearances upon determination that the motion characteristic of the pointer over the drop zone of the second container satisfies a defined criterion.

58. The system of claim 57, wherein the motion characteristic of the pointer is at least one of a speed and an acceleration of the pointer in the user interface, and the defined criterion specifies characteristic values of the speed or the acceleration that would cause the representations of the two or more selected items to adopt their respective second appearances.

59. A non-transitory computer-readable storage medium having instructions stored thereon, which, when executed by one or more processors, cause the one or more processors to perform operations comprising:

at a computing device with a display that is configured to display a user interface, and one or more input devices configured to receive inputs:

receiving an input, via the one or more input devices, dragging respective representations of one or more selected items displayed on the display from a first container in the user interface into a drop zone of a second container in the user interface such that the dragging passes over the drop zone, the respective representations of the one or more selected items having respective first appearances associated with the first container; and in response to the input:

in accordance with a determination that that the dragging meets appearance-modification criteria, wherein the appearance-modification criteria include a criterion that is met when the dragging has, while passing over the drop zone, slowed down below a threshold speed or stopped within the drop zone of the second container, modifying the respective representations of the one or more selected items to have respective second appearances associated with the second container, different than the respective first appearances; and in accordance with a determination that the dragging does not meet the appearance-modification criteria while the respective representations of the one or more selected items are passing over the drop zone of the second container to another location in the user interface, maintaining the respective representations of the one or more selected items as having the respective first appearances associated with the first container.

60. The non-transitory computer-readable storage medium of claim 59, wherein the respective representation of each of the one or more selected items includes two or more layers for at least one of the item's first and second appearances, and the operations further comprise:

animating the respective representation of at least one of the selected items to illustrate a respective transition from the item's first appearance to the item's second appearance, wherein a respective animation is performed on each of the two or more layers to illustrate the transition.

61. The non-transitory computer-readable storage medium of claim 60, wherein each of the two or more layers is associated with a respective animation style for the respective animation performed on the layer.

62. The non-transitory computer-readable storage medium of claim 59, wherein the operations further comprise:

while the respective representations of the one or more selected items are at least partially within an area of an ineligible drop target, causing the respective representations of the one or more selected items to adopt respective third appearances associated with the first container.

63. The non-transitory computer-readable storage medium of claim 59, wherein the respective representations of the one or more selected items are in a first formation when shown in their respective first appearances, and the respective representations of the one or more selected items are in a second formation when shown in their respective second appearances, and wherein the first formation is defined by the first container and the second formation is defined by the second container through an application programming interface (API).

64. A system comprising:

a display configured to display a user interface;

one or more input devices configured to receive inputs;

one or more processors; and memory having instructions stored thereon, which, when executed by the one or more processors, cause the one or more processors to perform operations comprising:

receiving an input, via the one or more input devices, dragging respective representations of one or more selected items displayed on the display from a first container in the user interface into a drop zone of a second container in the user interface such that the dragging passes over the drop zone, the respective representations of the one or more selected items having respective first appearances associated with the first container; and in response to the input:

in accordance with a determination that that the dragging meets appearance-modification criteria, wherein the appearance-modification criteria include a criterion that is met when the dragging has, while passing over the drop zone, slowed down below a threshold speed or stopped within the drop zone of the second container, modifying the respective representations of the one or more selected items to have respective second appearances associated with the second container, different than the respective first appearances; and in accordance with a determination that the dragging does not meet the appearance-modification criteria while the respective representations of the one or more selected items are passing over the drop zone of the second container to another location in the user interface, maintaining the respective representations of the one or more selected items as having the respective first appearances associated with the first container.

65. The system of claim 64, wherein the respective representation of each of the one or more selected items includes two or more layers for at least one of the item's first and second appearances, and the operations further comprise:

animating the respective representation of at least one of the selected items to illustrate a respective transition from the item's first appearance to the item's second appearance, wherein a respective animation is performed on each of the two or more layers to illustrate the transition.

66. The system of claim 65, wherein each of the two or more layers is associated with a respective animation style for the respective animation performed on the layer.

67. The system of claim 64, wherein the operations further comprise:

while the respective representations of the one or more selected items are at least partially within an area of an ineligible drop target, causing the respective representations of the one or more selected items to adopt respective third appearances associated with the first container.

68. The system of claim 64, wherein the respective representations of the one or more selected items are in a first formation when shown in their respective first appearances, and the respective representations of the one or more selected items are in a second formation when shown in their respective second appearances, and wherein the first formation is defined by the first container and the second formation is defined by the second container through an application programming interface (API).

* * * * *